(12) United States Patent
Jung et al.

(10) Patent No.: US 10,937,028 B2
(45) Date of Patent: Mar. 2, 2021

(54) STORE SYSTEM, METHOD OF CONTROLLING THE STORE SYSTEM, COMPUTER PROGRAM FOR EXECUTING THE METHOD, AND CHECKOUT DEVICE

(71) Applicant: KOREA SEVEN CO., LTD, Seoul (KR)

(72) Inventors: Seong In Jung, Seoul (KR); Young Hyouk Kim, Gimpo-si (KR); Su Nyun Kim, Ansan-si (KR)

(73) Assignee: KOREA SEVEN CO., LTD., Seoul (KR)

( * ) Notice: Subject to any disclaimer, the term of this patent is extended or adjusted under 35 U.S.C. 154(b) by 515 days.

(21) Appl. No.: 15/720,915

(22) Filed: Sep. 29, 2017

(65) Prior Publication Data
US 2019/0019191 A1    Jan. 17, 2019

(30) Foreign Application Priority Data

Jul. 14, 2017 (KR) .......................... 10-2017-0089676

(51) Int. Cl.
*G06Q 20/40* (2012.01)
*G06Q 20/18* (2012.01)
*G07G 1/00* (2006.01)

(52) U.S. Cl.
CPC ......... *G06Q 20/4014* (2013.01); *G06Q 20/18* (2013.01); *G06Q 20/40145* (2013.01); *G07G 1/00* (2013.01)

(58) Field of Classification Search
USPC ........................................................ 705/44
See application file for complete search history.

(56) References Cited

U.S. PATENT DOCUMENTS

| 6,269,348 B1 * | 7/2001 | Pare, Jr. ................ G01F 19/005 705/18 |
| 6,347,137 B1 | 2/2002 | Mason |

(Continued)

FOREIGN PATENT DOCUMENTS

| CN | 104361693 A | 2/2015 |
| CN | 105989560 A | 10/2016 |

(Continued)

OTHER PUBLICATIONS

Naraffar—24×7, Unmanned,,Swedish convenience Store; Is customer self-service the new model in retail? By Tarunika Tolani (Year: 2016).*

(Continued)

*Primary Examiner* — William E Rankins
(74) *Attorney, Agent, or Firm* — Kilpatrick Townsend & Stockton LLP

(57) ABSTRACT

A store system includes an authentication device configured to obtain personal information from a part of a body of a user, transmit the personal information to a first server, and receive authentication of the personal information from the first server; a gate control apparatus configured to open a gate so that the user may enter or exit a store, when the authentication device receives the authentication; and a checkout device configured to obtain personal information from a part of a body of the user, transmit the personal information to a second server, and pay a product price when receiving authentication of the personal information from the second server.

13 Claims, 10 Drawing Sheets

(56) References Cited

U.S. PATENT DOCUMENTS

| | | |
|---|---|---|
| 6,431,444 B1 | 8/2002 | Gatto |
| 6,522,772 B1 * | 2/2003 | Morrison .............. G06Q 20/208 |
| | | 235/383 |
| 8,355,992 B1 * | 1/2013 | Haugh ................... G07G 3/006 |
| | | 705/64 |
| 9,098,954 B1 * | 8/2015 | Byrd ....................... E01F 13/06 |
| 9,519,901 B1 * | 12/2016 | Dorogusker ......... G06Q 20/401 |
| 9,805,370 B1 * | 10/2017 | Quigley ............. G06Q 20/4014 |
| 2001/0018660 A1 * | 8/2001 | Sehr ....................... G06Q 10/02 |
| | | 705/5 |
| 2002/0019811 A1 * | 2/2002 | Lapsley ................. G06Q 20/02 |
| | | 705/44 |
| 2003/0018522 A1 * | 1/2003 | Denimarck ........ G06Q 30/0255 |
| | | 705/14.23 |
| 2003/0139984 A1 * | 7/2003 | Seigel ..................... G06F 21/10 |
| | | 705/28 |
| 2006/0157560 A1 | 7/2006 | Skor et al. |
| 2007/0094716 A1 * | 4/2007 | Farino ................ G07C 9/00103 |
| | | 726/5 |
| 2008/0249883 A1 | 10/2008 | Daily |
| 2009/0132381 A1 | 5/2009 | Gangi |
| 2010/0085146 A1 * | 4/2010 | Johnson ............. G07C 9/00087 |
| | | 340/5.53 |
| 2010/0214062 A1 * | 8/2010 | Hayashida ............... G06F 21/32 |
| | | 340/5.82 |
| 2010/0280958 A1 | 11/2010 | Hasson et al. |
| 2011/0213709 A1 * | 9/2011 | Newman ................ G06F 21/32 |
| | | 705/44 |
| 2011/0225055 A1 | 9/2011 | Takahashi |
| 2011/0231331 A1 | 9/2011 | Smith |
| 2011/0252238 A1 * | 10/2011 | Abuan ................ H04L 61/2575 |
| | | 713/168 |
| 2012/0127317 A1 * | 5/2012 | Yantek ..................... G01V 8/14 |
| | | 348/156 |
| 2012/0323621 A1 * | 12/2012 | Carlegren .............. G06Q 10/00 |
| | | 705/7.13 |
| 2013/0332271 A1 * | 12/2013 | Hay ....................... G06Q 20/20 |
| | | 705/14.51 |
| 2014/0316916 A1 | 10/2014 | Hay |
| 2015/0039458 A1 | 2/2015 | Reid |
| 2015/0109451 A1 | 4/2015 | Dhankhar |
| 2015/0120547 A1 * | 4/2015 | Ghosh ............. G06Q 20/40145 |
| | | 705/44 |
| 2015/0227923 A1 | 8/2015 | Kutsch et al. |
| 2015/0227938 A1 * | 8/2015 | Smets ..................... G06F 21/30 |
| | | 705/21 |
| 2016/0253680 A1 * | 9/2016 | Giera ................. G06Q 30/0201 |
| | | 705/7.29 |
| 2017/0046767 A1 | 2/2017 | Xiao et al. |

FOREIGN PATENT DOCUMENTS

| | | | |
|---|---|---|---|
| CN | 106663251 A | | 5/2017 |
| JP | 08016918 A | * | 1/1996 |
| JP | H09-027082 A | | 1/1997 |
| JP | 2007-065728 A | | 3/2007 |
| JP | 2009-009231 A | | 1/2009 |
| JP | 2010-286916 A | | 12/2010 |
| JP | 2013-045406 A | | 3/2013 |
| KR | 10-2005-053967 A | | 6/2005 |
| KR | 10-2010-0006802 A | | 1/2010 |
| KR | 10-2011-0122890 A | | 11/2011 |
| WO | 2007/026568 A1 | | 3/2007 |
| WO | 2017/179847 A1 | | 10/2017 |

OTHER PUBLICATIONS

Office Action and Search Report for Taiwanese Patent Application No. 106133820 dated Dec. 17, 2018, 11 pages.
Taiwanese Office Action and Search Report for Taiwanese Patent Application No. 106133820 dated Mar. 28, 2019, 6 pages.

* cited by examiner

STORE SYSTEM, METHOD OF CONTROLLING THE STORE SYSTEM, COMPUTER PROGRAM FOR EXECUTING THE METHOD, AND CHECKOUT DEVICE

CROSS-REFERENCE TO RELATED APPLICATION

This application claims the benefit of Korean Patent Application No. 10-2017-0089676, filed on Jul. 14, 2017, in the Korean Intellectual Property Office, the disclosure of which is incorporated herein in its entirety by reference.

BACKGROUND

1. Field

One or more embodiments relate to an unmanned store system, a method of controlling the unmanned store system, a computer program for executing the method, and an unmanned checkout device.

2. Description of the Related Art

In commercial spaces such as marts, supermarkets, shopping centers, and convenience stores where people can purchase products, when a user selects a product and goes to the counter, an employee generally directly scans the barcode of the product by using a reader, and the user pays the price of the product by using a payment method (for example, a credit card, cash, or the like).

Vending machines operate in an unmanned system where a user can purchase a product without the intervention of an employee by selecting the product and directly inserting a payment instrument into a vending machine to pay the price of the product. However, in general environments where one user purchases many products, such as marts, supermarkets, shopping centers, and convenience stores, there are many limitations to such an unmanned operation.

SUMMARY

One or more embodiments include an unmanned store system, a method of controlling the unmanned store system, a computer program for executing the method, and an unmanned checkout device.

Additional aspects will be set forth in part in the description which follows and, in part, will be apparent from the description, or may be learned by practice of the presented embodiments.

According to one or more embodiments, an unmanned store system includes an authentication device configured to obtain personal information from a part of a body of a user, transmit the personal information to a first server, and receive authentication of the personal information from the first server; a gate control apparatus configured to open a gate so that the user may enter or exit a store, when the authentication device receives the authentication; and an unmanned checkout device configured to obtain personal information from a part of a body of the user, transmit the personal information to a second server, and pay a product price when receiving authentication of the personal information from the second server.

The authentication device may include a first authentication device configured to be accessible from outside the store; and a second authentication device configured to be accessible from inside the store, and the gate control apparatus may be configured to open a first gate to allow the user to enter the store when the first authentication device receives authentication from the first server, and may be configured to open a second gate to allow the user to exit the store when the second authentication device receives authentication from the first server.

The authentication device may include a first authentication device configured to be accessible from outside the store, the gate control apparatus may be configured to open a first gate to allow the user to enter the store when the first authentication device receives an authentication from the first server, and the unmanned checkout device may be configured to pay a total price of a scanned product and open a second gate to allow the user to exit the store when the unmanned checkout device receives authentication from the second server.

When a product in a preset first category is scanned, the unmanned checkout device may be configured to determine that the product in the first category is in an unpayable state, transmit a call to a manager terminal, and change the unpayable state of the product in the first category to a payable state when an authentication code corresponding to the first category is obtained. When a product in a category other than the first category is scanned, the unmanned checkout device may be configured to determine that the product in a category other than the first category is in a payable state.

The management server may be configured to reissue the authentication code at intervals of a preset period and transmit the authentication code to a manager or the manager terminal.

The unmanned checkout device may include a scanner configured to scan an image code. When the image code scanned by the scanner is product identification (ID) information, the unmanned checkout device may be configured to add a product corresponding to the product ID information to a product list. When the image code scanned by the scanner is an authentication code, the unmanned checkout device may be configured to change the unpayable state of the product in the first category, which is a category corresponding to the authentication code, to a payable state.

The first server and the second server may be the same server.

According to one or more embodiments, a method of controlling an unmanned store system via a processor includes obtaining personal information from a part of a body of a user, transmitting the personal information to a first server, and receiving authentication of the personal information from the first server, wherein the obtaining, transmitting, and receiving are performed by a first authentication device; opening a first gate to allow the user to enter a store when the first authentication device receives the authentication, wherein the opening is performed by a gate control apparatus; and obtaining personal information from a part of a body of the user, transmitting the personal information to a second server, and paying a total product price when receiving authentication of the personal information from the second server, wherein the obtaining, transmitting, and paying are performed by an unmanned checkout device.

The method may further include obtaining personal information from a part of a body of a user, transmitting the personal information to a first server, and receiving authentication of the personal information from the first server, wherein the obtaining, transmitting, and receiving are performed by a second authentication device; and opening a second gate to allow the user to exit the store when the second authentication device receives the authentication, wherein the opening is performed by the gate control apparatus. The first authentication device may be configured to be accessible from outside the store, and the second authentication device may be configured to be accessible from inside the store.

The first authentication device may be configured to be accessible from outside the store, and the paying may include opening a second gate to allow the user to exit the store when receiving authentication from the second server, wherein the opening is performed by the gate control apparatus.

The paying may include scanning ID information of a product by using a scanner of the unmanned checkout device; determining whether the product belongs to a preset first category; when the product belongs to the first category, determining that the product is in an unpayable state and transmitting a call to a manager terminal; and when an authentication code corresponding to the first category is obtained, changing the unpayable state of the product in the first category to a payable state.

A management server of the unmanned store system may be configured to reissue the authentication code at intervals of a preset period and transmit the authentication code to a manager or the manager terminal.

The paying may include scanning an image code by using a scanner of the unmanned checkout device; when the image code is ID information of a product, determining that the product is in an unpayable state or a payable state according to a category of the product and adding the product to a product list; and when the image code is an authentication code, changing a state of a product in a first category, which is a category corresponding to the authentication code, from among products included in the product list, to a payable state.

According to one or more embodiments, a computer program is stored on a medium to execute the method by using a computer.

According to one or more embodiments, an unmanned checkout device includes a scanner configured to scan an image code; and a controller configured to, when identification (ID) information of a product in a preset first category is scanned, determine that the product in the first category is in an unpayable state and transmit a call to a manager terminal, when an authentication code corresponding to the first category is scanned, change the unpayable product in the first category to a payable state, and when a product in a category other than the first category is scanned, determine that the product in a category other than the first category is in a payable state.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
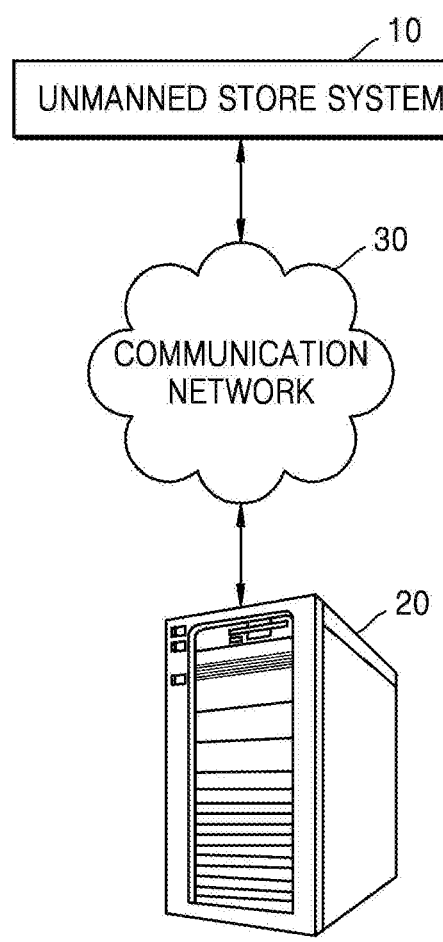
FIG. 1 is a schematic diagram of an unmanned checkout system according to an embodiment of the present invention.

As the invention allows for various changes and numerous embodiments, particular embodiments will be illustrated in the drawings and described in detail in the written description. The attached drawings for illustrating exemplary embodiments are referred to in order to gain a sufficient understanding of the effects and features thereof, and methods for accomplishing the effects and features thereof. However, this is not intended to limit the invention to particular modes of practice, and it is to be appreciated that all changes, equivalents, and substitutes that do not depart from the spirit and technical scope are encompassed in the invention.

Hereinafter, the present invention will be described in detail by explaining exemplary embodiments of the invention with reference to the attached drawings. Like reference numerals in the drawings denote like components, and thus their description will be omitted.

It will be understood that although the terms "first", "second", etc. may be used herein to describe various components, these components should not be limited by these terms. These components are only used to distinguish one component from another. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of components in the drawings may be exaggerated for convenience of explanation. In other words, since sizes and thicknesses of components in the drawings are arbitrarily illustrated for convenience of explanation, the following embodiments are not limited thereto.

FIG. 1 is a schematic diagram of an unmanned checkout system according to an embodiment of the present invention.

The unmanned checkout system of FIG. 1 includes an unmanned store system 10, a server 20, and a communication network 30.

FIG. 1 illustrates only components of the unmanned checkout system related to the present embodiment, in order to prevent the features of the present embodiment from being obscured. Accordingly, it may be understood by one of ordinary skill in the art related to the present embodiment that general-use components other than the components of FIG. 1 may be further included in the unmanned checkout system.

The communication network 30 connects the unmanned store system 10 to the server 20. For example, the communication network 30 provides a connection path such that the unmanned store system 10 is connected to the server 20 and then transmits or receives packet data to or from the server 20. The communication network 30 may include, but is not limited to, wired networks, for example, local area networks (LANs), wide area networks (WANs), metropolitan area networks (MANs), integrated service digital networks (IS-DNs), or wireless networks, for example, wireless LANs, CDMA, Bluetooth, satellite communication, 3G, 4G, 5G, and LTE.

The server 20 may communicate with the unmanned store system 10 to perform authentication of personal information of a user or approve a payment based on the personal information of the user.

The server 20 may store personal information of a pre-registered user. The server 20 may further store bank account information about the personal information of the user. The bank account information may be a bank account from which a withdrawal is possible or information about a credit card capable of withdrawal or payment. The server 20 is not limited to an example of including only a single server device as shown in FIG. 1, and the server 200 may include a plurality of server devices.

For example, the server 20 may include a first server that performs authentication of personal information, and a second server that performs authentication of personal information and stores bank account information corresponding to the personal information. According to the present embodiment, the authentication of the personal information may include primary authentication by the first server to authenticate the personal information, and secondary authentication by the second server to authenticate the bank account information corresponding to the personal information.

The unmanned store system 10 may be used to operate a store with a minimum number of employees. The user may enter the store by using his or her personal information and purchase a product in the store by using his or her personal information. The unmanned store system 10 may not require any intervention of an employee. However, in some situations, the unmanned store system 10 may require some intervention of employees.

Figure 2:
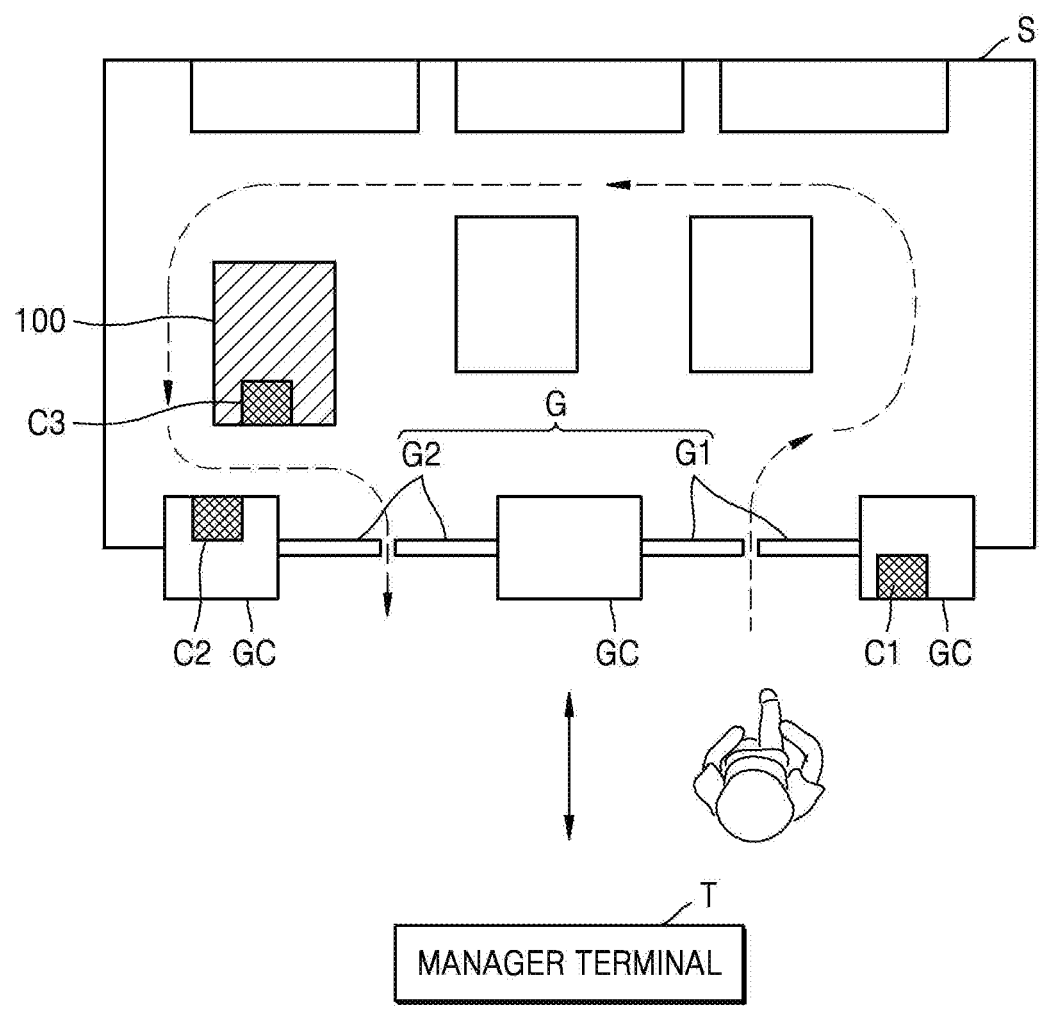
FIG. 2 is a schematic diagram of the unmanned store system according to an embodiment of the present invention.

FIG. 2 is a schematic diagram of the unmanned store system 10 according to an embodiment of the present invention.

Referring to FIG. 2, the unmanned store system 10 includes an unmanned store S and a manager terminal T.

The unmanned store S may include a gate G that controls access of a user, a gate control apparatus GC that controls the gate G and an unmanned checkout device 100 for product payment.

The gate control apparatus GC includes authentication devices C1 and C2 that obtain biometric information from the user to extract personal information. The authentication devices C1 and C2 may communicate with the server 20 of FIG. 1 and perform authentication of the personal information of the user, and the gate control apparatus GC may control the gate G according to authentication results of the authentication devices C1 and C2.

The authentication devices C1 and C2 include a first authentication device C1 provided outside the unmanned store S, and a second authentication device C2 provided inside the unmanned store S.

When the personal information of the user is authenticated by the first authentication device C1, the gate control apparatus GC opens a first gate G1 so that the user may enter the unmanned store S.

When the personal information of the user is authenticated by the second authentication device C2, the gate control apparatus GC opens a second gate G2 so that the user may exit the unmanned store S.

The unmanned checkout device 100 includes an authentication device C3 that obtains biometric information from the user to extract personal information. The authentication device C3 may communicate with the server 20 of FIG. 1 and perform authentication with respect to the personal information of the user, and the unmanned checkout device 100 may pay a product price according to an authentication result of the authentication device C3.

An example of a movement path of the user will now be described with reference to FIG. 2. The user provides his or her biometric information to the first authentication device C1 so that the first authentication device C1 may extract the personal information of the user. When the personal information is authenticated and thus the first gate G1 is opened, the user enters the unmanned store S. The user selects a product while looking around a product display table, and then pays the price of the selected product by using the unmanned checkout device 100. The user provides his or her biometric information to the second authentication device C2 so that the second authentication device C2 may extract the personal information of the user. When the personal information is authenticated and thus the second gate G2 is opened, the user exits the unmanned store S.

The unmanned store S of FIG. 2 may transmit a call to the manager terminal T under preset conditions. According to an example, the gate control apparatus GC may include a call button (not shown), and, when the user presses the call button, the manager terminal T may be called. According to an example, the unmanned checkout device 100 may call the manager terminal T under preset conditions. For example, the unmanned checkout device 100 may scan identification (ID) information of a product put by the user, and, when a product in a specific category is scanned, the unmanned checkout device 100 may call the manager terminal T. Alternatively, the unmanned checkout device 100 may provide a button (physical button, or button displayed on a touch panel screen) capable of calling the manager terminal T, and, when the button is selected, the unmanned checkout device 100 may call the manager terminal T.

When the manager terminal T receives the call from the unmanned store S, the manager terminal T may display to a manager the fact that a call has been received and/or the contents of the call. For example, the manager terminal T may include a display, and, when a call is received, the display may display the contents of the call on the display. When a call is transmitted to the manager terminal T by the call button included in the gate control apparatus GC, the manager terminal T may display, on the display, simple information indicating that the call has been generated from a gate, for example, a message "gate". Alternatively, when a product in a specific category is scanned by the unmanned checkout device 100 and the manager terminal T is called, the manager terminal T may display, on the display, simple information indicating that the call has been generated by the unmanned checkout device 100, for example, a message "POS machine".

The method whereby the manager terminal T displays information is not limited thereto, and a lamp of a color corresponding to each call may be turned on. In response to a call, the manager terminal T may inform reception of the call via vibration.

The unmanned store S and the manager terminal T may communicate with each other wirelessly, but the method of communication is not limited thereto.

Figure 3:
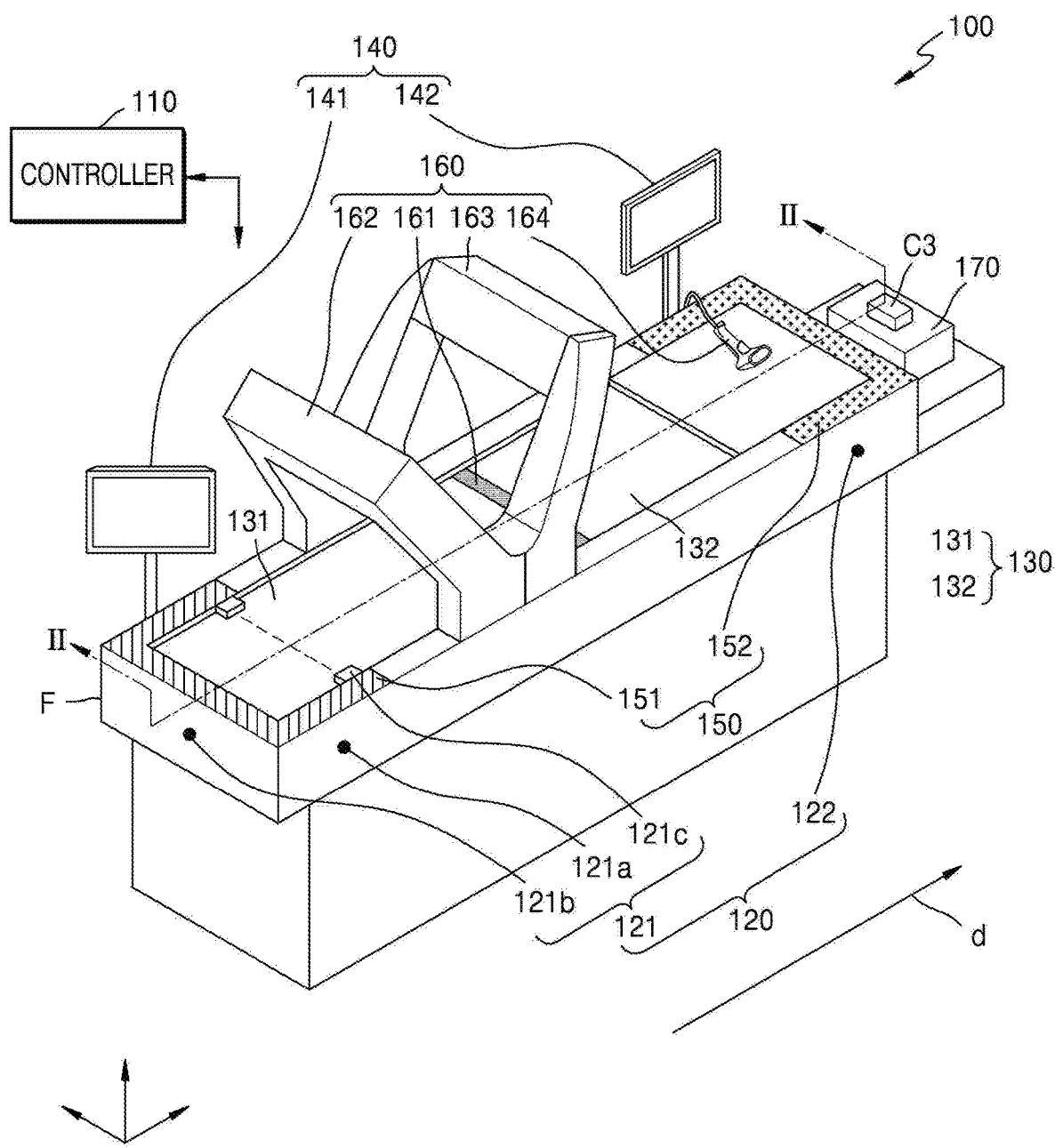
FIG. 3 is a schematic perspective view of an unmanned checkout device according to an embodiment of the present invention.

FIG. 3 is a schematic perspective view of the unmanned checkout device 100 according to an embodiment of the present invention.

Referring to FIG. 3, the unmanned checkout device 100 scans identification (ID) information of a product put by a user while transferring the product on a conveyor belt, enables the user to pay a total product price according to the scanned ID information of the product, and automatically controls the conveyor belt to be driven to smoothly put and transfer the product.

The conveyor belt transfers a product put thereon in a traveling direction d from an entry end via which the product enters to an exit end via which the product exits, while rotating in the traveling direction d.

Because a product is transferred from the entry end to the exit end in the traveling direction d, the exit end will now be described as being in front, that is, the entry end being at rear, as viewed in the traveling direction d, for convenience of explanation.

A structure of the unmanned checkout device 100 will now be schematically described. The unmanned checkout device 100 includes a controller 110 that controls the entire unmanned checkout device 100, a sensor unit 120 that senses an object, a transfer unit 130 that transfers a product, a display 140 that outputs a guide screen image, a light-emitter 150 that provides a user with intuitive visual information, a scanner 160 that scans product information, and a payment unit 170.

The sensor unit 120 may include a first sensor 121 that senses an object in a first region, and a second sensor 122 that senses an object in a second region. The second region is closer to the exit end than to the entry end, and the first region is closer to the entry end than to the exit end. In other words, the second region may be a region in front of the first region as viewed in the traveling direction d, which is a transfer direction of a product. Thus, a direction from the first region to the second region may be the traveling direction d. The direction from the first region to the second region may also be understood as being approximately parallel to the traveling direction d. For example, the first region may include the entry end of the unmanned checkout device 100 and/or the vicinity of the entry end, and the second region may include the exit end of the unmanned checkout device 100 and/or the vicinity of the exit end.

According to an example, the first region may be a region up to a certain distance within a certain angle range ahead of sensors 121a and 121b. According to an example, the first region may be a region between a plurality of sensing terminals of a sensor 121c. According to an example, the second region may be a region up to a certain distance within a certain angle range ahead of the second sensor 122.

The first sensor 121 may sense an object that approaches the unmanned checkout device 100, in detail, sense a person and/or product that approaches the entry end of the unmanned checkout device 100.

According to an example, the first sensor 121 may include the sensors 121a and 121b, which are arranged on a frame F of the entry end. The sensors 121a and 121b may be provided on a side end and/or a rear end of the frame F while facing the outside of the frame F, and the first region, which is a detection target region of the sensors 121a and 121b, may be an external region of the frame F. The detection target region of the sensors 121a and 121b may be a person. A person trying to pay a product by using the unmanned checkout device 100 according to the present embodiment approaches the unmanned checkout device 100 and puts the product on the unmanned checkout device 100. Consequently, the person inevitably approaches the entry end of the unmanned checkout device 100. Accordingly, the sensors 121a and 121b may regard the person approaching the entry end of the unmanned checkout device 100, as a detection target object. To this end, the first sensor 121 may include only the sensor 121a on the side end of the frame F, or only the sensor 121b on the rear end of the frame F. Types of the sensors 121a and 121b may be a passive infrared (PIR) sensor or an IR sensor, but are not limited to specific sensors.

The first sensor 121 may include the sensor 121c that senses a product put on the conveyor belt of the transfer unit 130. The sensor 121c may include two sensing terminals attached to the frame F and opposite to each other, and may sense whether a product is put between the two sensing terminals.

The first sensor 121 may include a combination of at least one of the sensors 121a, 121b, and 121c. According to an example, the first sensor 121 may sense a person by including one of the sensors 121a and 121b, and may sense a product by including the sensor 121c, thereby sensing an object in a double-check manner.

The second sensor 122 includes a sensor arranged on a frame F of the exit end to sense an object that approaches the exit end. According to an example, the second sensor 122 may be provided on a front end and/or a side end of the frame F while facing the outside of the frame F, and the second region, which is a detection target region of the second sensor 122, may be an external region of the frame F. The second sensor 122 may be a sensor for sensing an approach of a person, and types thereof may be a PIR sensor or an IR sensor but are not limited to specific sensors. The second sensor 122 may be arranged around the exit end on one side of the frame F as described above and sense a person who approaches the exit end.

The aforementioned locations and types of the first sensor 121 and the second sensor 122 are exemplary, and embodiments are not limited thereto. Because the first sensor 121 is included to sense a user who approaches the entry end and/or a product put on the conveyor belt, the first sensor 121 may be designed to have any of various locations and any of various types. Because the second sensor 122 is included to sense a user who enters the exit end, for example, a user who puts all products on the conveyor belt near the entry end, moves in the traveling direction d, and then enters the exit end, the second sensor 122 may be designed to have any of various locations and any of various types.

The transfer unit 130 may include a roller, and a conveyor belt that transfers a product according to a rotation of the roller. The roller may be driven under the control of the controller 110. The conveyor belt moves a product in the traveling direction d according to a rotation of the roller.

The transfer unit 130 may include a first transfer part 131 and a second transfer part 132 separated by a first scan sensor 161 that is located below a product and scans the ID information of the product. The first transfer part 131 may include a conveyor belt that rotates to transfer a product in the traveling direction d according to a rotation of a roller. The second transfer part 132 may include a conveyor belt that rotates to transfer a product in the traveling direction d according to a rotation of a roller.

The product put on the conveyor belt of the first transfer part 131 may be transferred in the traveling direction d according to the rotation of the first transfer part 131, pass the first scan sensor 161, and be transferred to the conveyor belt of the second transfer part 132 according to the rotation of the second transfer part 132. During this process, the ID information of the product attached onto a bottom surface of the product may be scanned by the first scan sensor 161.

The first scan sensor 161 may be one of a plurality of scan sensors included in the scanner 160. Because the scanner 160 may include not only the first scan sensor 161 but also at least one scan sensor for scanning the ID information from a top surface or side surface of the product, the scanner 160 may scan the ID information of the product in all directions. For example, the second scan sensor 162 may scan ID information attached onto a surface of the product in the traveling direction d (a front surface) or a top surface of the product, and the third scan sensor 163 may scan ID information attached onto a surface of the product in a direction reverse to the traveling direction d (rear surface) or the top surface of the product. For example, the scanner 160 may further include scan sensors for scanning ID information attached onto both side surfaces of the product. The product may pass the conveyor belt of the second transfer part 132 and may be loaded on the frame F.

The first transfer part 131 and the second transfer part 132 may be equally driven according to one driving-control signal received from the controller 110. According to another embodiment, the first transfer part 131 and the second transfer part 132 may respectively receive different driving-control signals from the controller 110 and may be independently driven. According to another embodiment, the first transfer part 131 and the second transfer part 132 may be driven by using the one driving-control signal received from the controller 110 in another manner, and thus driving of the first transfer part 131 and driving of the second transfer part 132 may be set to be different but be connected to each other.

The display 140 includes a display that outputs a guide screen image for providing information to the user. The display 140 may include a first display 141 located on the entry end, and a second display 142 located on the exit end. The first display 141 may display, on a screen, information that is to be provided to a user who puts a product on the entry end or to a next user who waits on the entry end, and may be mounted to face the entry end or a waiting line. The second display 142 may display payment-related information that is to be provided to a user located on the exit end to execute a payment. The second display 142 may be mounted to face the exit end or the front of the payment unit 170 (place where a user is expected to stand to use the payment unit 170). The display 140 may include a touch screen.

The light-emitter 150 includes at least one lamp that emits light in one of at least one preset state in order to provide a user with intuitive visual information. Light-emission states of the light-emitter 150 are classified according to light colors or light-emission patterns. For example, the light-emission states may be classified into a first state in which green light is emitted, and a second state in which red light is emitted. The light-emission states may further include a third state in which green light emission and non-emission repeatedly flicker, and a fourth state in which red light emission and non-emission repeatedly flicker. The light-emission states may further include at least one state classified according to flickering patterns. The colors of light emitted by the light-emitter 150 are not limited to green and red colors, and various modifications may be made to the colors.

The light-emitter 150 includes a first light-emitter 151 provided on the entry end, and a second light-emitter 152 provided on the exit end. The light-emission states of the first light-emitter 151 located on the entry end may provide various pieces of information to a user. For example, the first state or the third state may mean a state where a product can be put on the entry end, and the second state or the fourth state may mean a state where a product cannot be put on the entry end. The light-emission states of the second light-emitter 152 located on the exit end may provide various pieces of information to a user. For example, as will be described in detail later, the first state or the third state may mean a state where ID information of a product has been properly scanned by the scanner 160, and the second state or the fourth state may mean a state where ID information of at least one of a plurality of products has not been properly scanned by the scanner 160.

Although each of the first light-emitter 151 and the second light-emitter 152 includes a one-body light-emission surface in FIG. 1, each of the first light-emitter 151 and the second light-emitter 152 may include a plurality of light-emission surfaces spaced apart from each other. The plurality of light-emission surfaces included in the first light-emitter 151 may be controlled according to the same control signal, and the plurality of light-emission surfaces included in the second light-emitter 152 may also be controlled according to the same control signal. The first light-emitter 151 and the second light-emitter 152 are independently controlled according to different control signals. For example, while the product transferred by the transfer unit 130 is being scanned by the scanner 160, the first light-emitter 151 may operate to inform the purchaser or the like that scanning is being conducted, and, while a payment is being performed, the second light-emitter 152 may operate to inform the purchaser or the like that payment is being conducted.

The scanner 160 may scan ID information (for example, a barcode, a QR code, and an electronic code) of a product. The ID information may be printed on or attached to an external surface of the product. The scanner 160 may scan ID information of the product on the 360° entire area of the product by including a plurality of scan sensors, thereby sensing the ID information attached onto the product no matter which direction the product is oriented.

For example, the scanner 160 may include a first scan sensor 161, a second scan sensor 162, and a third scan sensor 163. As will be described later, the first scan sensor 161 may scan product ID information attached onto a bottom surface of the product transferred on the transfer unit 130. The second scan sensor 162 may scan ID information attached onto a surface of the product in the traveling direction d (front surface) or a top surface of the product, and the third scan sensor 163 may scan ID information attached onto a surface of the product in a direction reverse to the traveling direction d (rear surface) or the top surface of the product. Embodiments are not limited thereto, and the third scan sensor 163 may scan the ID information attached onto the surface of the product in the traveling direction d (front surface) or the top surface of the product, and the second scan sensor 162 may scan the ID information attached onto the surface of the product in the direction reverse to the traveling direction d (rear surface) or the top surface of the product. The scanner 160 may further include scan sensors (not shown) for scanning ID information attached onto both side surfaces of the product. As such, the scanner 160 may scan ID information of the product in all directions.

The scanner 160 may further include a reader 164 directly held by a user to manually scan the ID information of a product. When "a non-scanned product" of which ID information has not been scanned by the first scan sensor 161, the second scan sensor 162, and the third scan sensor 163 exists, the user may scan ID information of the non-scanned product by using the reader 164. The reader 164 may be used to scan not only product information but also an authentication code. The authentication code may be carried by the manager, and when a visual check by the manager is necessary, the manager may scan the authentication code by using the reader 164 to thereby verify that the visual check has been performed.

The payment unit 170 pays a total price of scanned products. According to an embodiment, the payment unit 170 may be connected to the third authentication device C3, and the third authentication device C3 may obtain personal information from the user. The third authentication device C3 may transmit payment method information including the obtained personal information to the server 20 and may receive a payment approval from the server 20. In response to the payment approval, the payment unit 170 may perform subsequent processes, such as, determining that a final payment has been completed and outputting a receipt. The personal information may include biometric information of the user. The biometric information may be information extracted from a vein pattern recognized from a palm of the user.

The payment unit 170 may further obtain additional information that complements the biometric information of the user, and may transmit payment method information including the personal information and the additional information to the server 20. The additional information may be a mobile phone number directly input by the user. The user may connect his or her biometric information and additional information with each other and register them in the server 20 in advance for self-authentication. The server 20 may receive the payment method information from the payment unit 170, approve the payment when the payment method information is verified, and provides a result of the approval to the payment unit 170.

The controller 110 may entirely control the unmanned checkout device 100. The controller 110 may receive a signal from each of the units included in the unmanned checkout device 100 and transmit a signal to each of the units, thereby controlling each of the units. To this end, the controller 110 may be connected to each of the units of the unmanned checkout device 100 by wire or wirelessly to exchange data with each of the units. A detailed controlling method of the controller 110 will be described later with reference to FIG. 4.

The frame F may have a length in the traveling direction d that is greater than a width in a direction perpendicular to the traveling direction d. The sensors 121a and 121b of the first sensor 121, and the second sensor 122 may be provided on respective one ends of two longer edges from among four edges of the frame F. According to an example, the first sensor 121 may sense a user who enters one end of the frame F and is located in the first region, and the second sensor 122 may sense a user who moves from the one end of the frame F in the traveling direction d and enters the second region.

Although the unmanned checkout device 100 has been described above, embodiments are not limited thereto. In other words, a method and apparatus for controlling the unmanned checkout device 100, and an unmanned store system using the method, the apparatus, and the unmanned checkout device 100 will be understood as also belonging to the scope of the present invention. The above detailed descriptions of the unmanned checkout device 100 are equally applicable to the method and apparatus for controlling the unmanned checkout device 100 and the unmanned store system using the method and apparatus.

For example, the apparatus for controlling the unmanned checkout device 100 is capable of controlling the unmanned checkout device 100 and thus may be understood as having the controller 110. In other words, the apparatus for controlling the unmanned checkout device 100 controls the unmanned checkout device 100 including the sensor unit 120, the transfer unit 130, and the scanner 160, and thus may be understood as including the controller 110.

The method of controlling the unmanned checkout device 100 may be understood as a method of controlling the unmanned checkout device 100 by using a processor. In other words, the method of controlling the unmanned checkout device 100 is a method of controlling the unmanned checkout device 100 including the sensor unit 120, the transfer unit 130, the scanner 160, and a processor, and thus may be understood as a method in which the processor performs the functions of the controller 110. For example, the method of controlling the unmanned checkout device may include a scan operation and a stop operation. In the scan operation, the processor may drive the transfer unit 130 when an object is sensed by the first sensor 121, and, while the transfer unit 130 is being driven, the processor may receive product ID information scanned by the scanner 160. In the stop operation, when an object is sensed by the second sensor 122, the processor may stop the transfer unit 130 from being driven.

Figure 4:
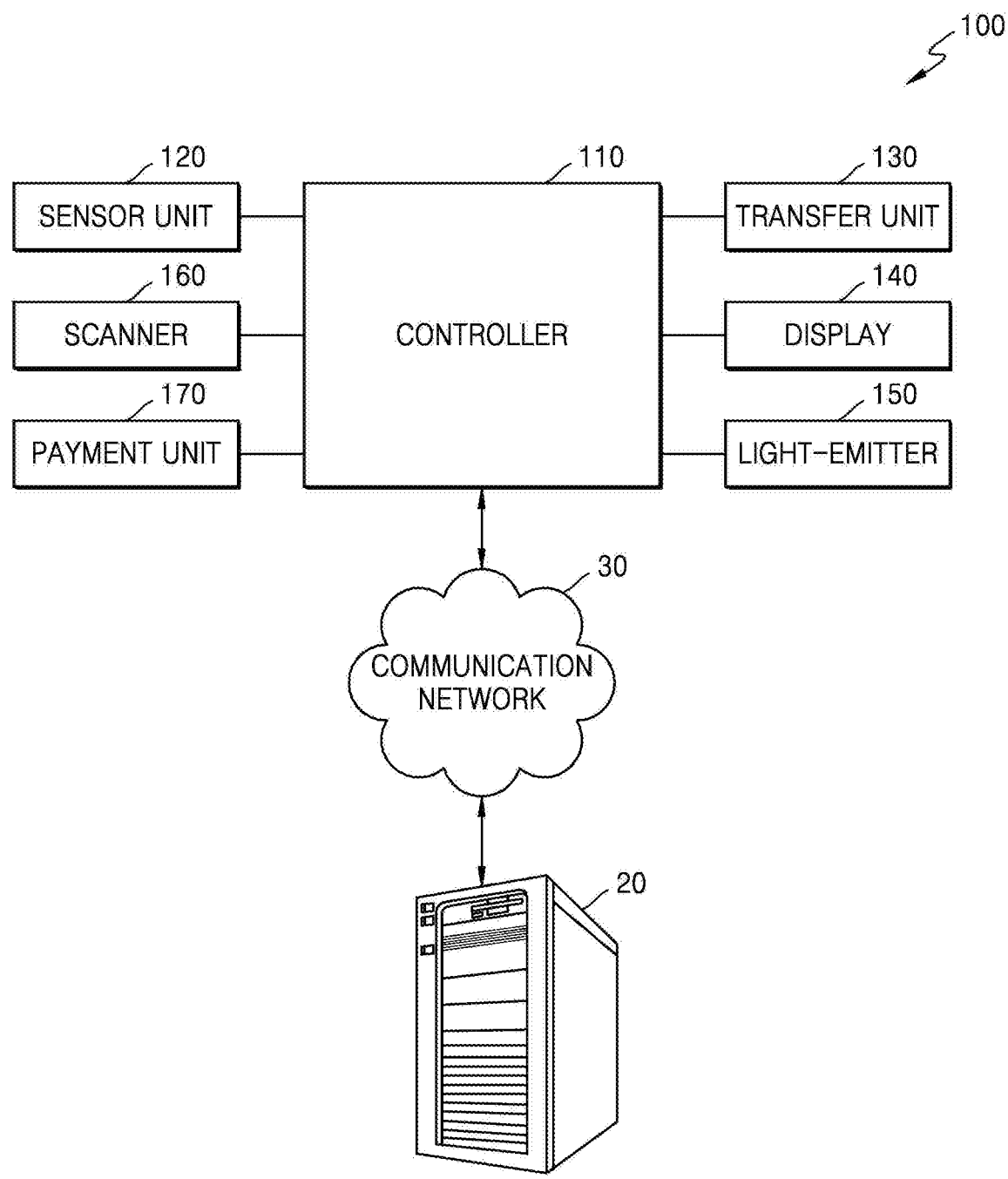
FIG. 4 is a schematic block diagram of an attended payment system according to an embodiment of the present invention.

FIG. 4 is a schematic block diagram of an attended payment system according to an embodiment of the present invention.

Referring to FIG. 4, the unmanned checkout device 100 communicates with the server 200 via the communication network 30. The unmanned checkout device 100 includes the controller 110 as shown in FIG. 3, and includes a plurality of units.

Because the unmanned checkout device 100 of FIG. 4 is the same as the unmanned checkout device 100 of FIG. 3, the descriptions made above with reference to FIG. 3 may equally apply to the embodiment shown in FIG. 4. More detailed embodiments related to an operation of the controller 110 will now be described.

The controller 110 may correspond to at least one processor or may include at least one processor. Accordingly, the controller 110 may be driven by being included in another hardware device such as a micro-processor or a general-use computer system.

The controller 110 may control the transfer unit 130 according to whether the sensor unit 120 senses an object. First, when an object is sensed by the first sensor 121, the controller 110 drives the transfer unit 130 to transfer a product in the traveling direction d. The product may be loaded on the frame F via the first transfer part 131, the first scan sensor 161, and the second transfer part 132.

While the transfer unit 130 is being driven, the controller 110 may control the scanner 160 to scan the product information of the product, control the display 140 to display a screen image that provides information to the user, and control the light-emitter 150 to provide visually-intuitive information to the user. When an object is sensed by the second sensor 122, the controller 110 may control at least a portion of the transfer unit 130 to stop being driven, and provide payment-related information to the user via the display 140 and the light-emitter 150, thereby inducing the user to conduct a payment by using the payment unit 170.

While the product is being transferred, the scanner 160 scans ID information of the product under the control of the controller 110. In detail, the scanner 160 scans the ID information of a product that is transferred by the transfer unit 130 in the traveling direction d and reaches the scan region of the scanner 160. The scanner 160 may consecutively scan pieces of ID information of a plurality of products, and the controller 110 may accumulatively store the scanned pieces of ID information.

When a person is sensed by the second sensor 122, the controller 110 may stop the transfer unit 130 from being driven. Alternatively, when the person is sensed by the second sensor 122, the first transfer part 131 of the transfer unit 130 may be stopped being driven, and the second transfer part 132 of the transfer unit 130 may continue being driven. After a purchaser of the product puts the product on the first transfer part 131, the purchaser may move to the vicinity of the second sensor 122 to pay the product and may be sensed by the second sensor 122. Thus, while the purchaser is moving to the vicinity of the second sensor 122, the product may be transferred from the first transfer part 131 onto the second transfer part 132, and then the second sensor 122 may sense the purchaser. In this case, the second transfer part 132 may keep being driven to continue the transfer of the product. When the purchaser moves near the second sensor 122, a subsequent purchaser may put his or her product on the first transfer part 131. In this case, the product of the subsequent purchaser needs to be prevented from mixing with the product of the previous purchaser, and ID information of the product of the subsequent purchaser needs to be prevented from being scanned by the scanner 160. Accordingly, when a person is sensed by the second sensor 122, driving of the first transfer part 131 of the transfer unit 130 may be stopped so that the product put on the first transfer part 131 is not transferred toward the second transfer part 132, and thus mixing of the product of the subsequent purchaser with the product of the previous purchaser may be prevented and scanning of the ID information of the product of the subsequent purchaser by the scanner 160 may be prevented.

The controller 110 may stop the transfer unit 130 from being driven, from a moment when a payment of the payment unit 170 starts to a moment when the payment unit 170 receives a payment approval. Accordingly, after a payment of a first purchaser is completed, product information of a product of a second purchaser is scanned by the scanner 160.

According to an embodiment, the user may manually drive the transfer unit 130 by using a special switch (not shown). The manual control by the switch may have priority over automatic control of the controller 110 based on the sensor unit 120.

The controller 110 controls the scanner 150. For example, the controller 110 controls the transfer unit 150 according to object sensing by the first sensor 121. In detail, the controller 110 informs that scanning is in progress and a product can be put, by turning on the first light-emitter 151 on the entry end in a first state. The first state may be a preset state in which the first light-emitter 151 is turned on so that the user may intuitively recognize the meaning of "ON". For example, in the first state, the first light-emitter 151 may be turned on in green, but embodiments are not limited thereto, and the first light-emitter 151 may be turned on in at least one preset color that gives a positive impression, such as a green color, a blue color, and a white color.

The controller 110 may inform that a payment is not yet conducted, by turning on the second light-emitter 152 on the exit end in a second state. The second state may be a preset state in which the second light-emitter 152 is turned on so that a user may intuitively recognize the meaning of "STOP". For example, in the second state, the second light-emitter 152 may be turned on in red, but embodiments are not limited thereto, and the second light-emitter 152 may be turned on in at least one preset color that gives a negative impression, such as a yellow color.

According to an embodiment, when a payment of a previous user is completed and thus a next user is able to put a product, the controller 110 may turn on the first light-emitter 151 in the first state. According to the present embodiment, the first light-emitter 151 may have already been turned on in the first state before an object is sensed by the first sensor 121, and, when an object is sensed by the first sensor 121, the controller 110 may maintain the turned-on state of the first light-emitter 151.

When a payment of a previous user is completed and thus a next user is able to put a product, the controller 110 may turn on the second light-emitter 152 in the second state.

The controller 110 controls display of the display 140. In detail, the controller 110 may control the first display 141 facing a user who puts a product on the entry end, to display the ID information of a scanned product in real time. For example, the controller 110 may control the display 140 to display pieces of ID information of most recently-scanned N products, where N is a number equal to or greater than 1 and may be adequately set according to environments of the display 140. The number N may be set to be 1 so that only one product that has been scanned most recently is displayed on the first display 141. The user may recognize a product scan in real time while putting a product. The controller 110 may control the second display 142 on the exit end to display a list of all scanned products and a total product price.

The controller 110 further controls a series of data processing operations that are performed before a final payment operation starts.

The controller 110 controls an additional scan processing operation of displaying non-scanned product information on the second display 142 so that, when "non-scanned product", of which product information has not been scanned by the first, second, and third scan sensors 161, 162, and 163 exists, the user manually scans the product information by using the reader 164, and of obtaining scanned ID information by using the reader 164.

In the case of a product in a specific category, a visual check by the manager may be required according to a legal restriction or for any of the other reasons. For example, an "alcohol" product under the current law needs to be sold after it is checked directly by an employee whether a purchase of the "alcohol" product is an adult. The unmanned checkout device 100 may control the attended payment system so that a visual check by an employee is conducted only on such a product category.

For example, a category corresponding to each product may be previously designated, and the category may be checked via ID information of the product. The category of each product may be designated as at least one of a plurality of categories. The plurality of categories may include a first category, a second category, and the like. Examples of the plurality of categories may include alcohol, clothing, and tobacco.

A first category may be previously designated as category information corresponding to each product of the first category. In other words, when a product in the first category is registered in the attended payment system, the manager may designate category information corresponding to the product as the first category. The first category may be an alcohol category that needs a visual check by the manager.

The controller 110 checks if the product scanned by the scanner 160 is a product pre-designated as belonging to the first category, based on ID information of the scanned product. When the scanned product is a product pre-designated as belonging to the first category, the controller 110 first sets the state of the scanned product as an unpayable state and calls the manager terminal T of FIG. 2. When the manager inputs an authentication code corresponding to the first category to the scanner 160 after completing a visual check, the controller 110 may change the state of the product to a payable state. The user may perform a final payment with respect to only products in the payable state.

In detail, even when product information has been scanned by the scanner 160, if a corresponding product belongs to the first category that requires a visual check by the manager, the controller 110 may add the corresponding product to a scanned product list but may determine and display the state of the corresponding product as an unpayable state. The controller 110 calls the manager terminal T so that the manager scans an authentication code by using the reader 164. When the authentication code is scanned by the reader 164, the controller 110 may determine and display a state of a product in the first category corresponding to the authentication code, from among products in the unpayable state, as the payable state.

Categories according to an embodiment may include a first category that requires a visual check by a first manager, and a second category that requires a visual check by a second manager.

When a product in the first category is scanned, the controller 110 may call the first manager, add the product to a scanned product list, and determine and display a state of the product as the unpayable state. When the first manager has scanned a first authentication code corresponding to the first category by using the reader 164, the controller 110 may determine and display a state of a product in the first category corresponding to the first authentication code, from among products in the unpayable state, as the payable state.

When a product in the second category is scanned, the controller 110 may call the second manager, add the product to the scanned product list, and determine and display a state of the product as the unpayable state. When the second manager has scanned a second authentication code corresponding to the second category by using the reader 164, the controller 110 may determine and display a state of a product in the second category corresponding to the second authentication code, from among the products in the unpayable state, as the payable state.

A case where the scanned product list includes a plurality of unpayable products and the plurality of unpayable products include both products in the first category and products in the second category may be assumed. In this case, according to an authentication code scanned by the reader 164, the controller 110 may determine a state of a product in a specific category as the payable state. When the authentication code scanned by the reader 164 is the first authentication code corresponding to the first category, the controller 110 determines a state of a product in the first category as the payable state. When the authentication code scanned by the reader 164 is the second authentication code corresponding to the second category, the controller 110 determines a state of a product in the second category as the payable state.

Because the above-described first and second managers are distinguished from each other for convenience of explanation, the first and second managers may not be necessarily different persons. In other words, according to manpower circumstances, a single manager may hold the first authentication code and the second authentication code and scan the first authentication code and/or the second authentication code by using the scanner 160 as necessary.

An authentication code may be reissued periodically by the unmanned store system 10, for example, by a management server of the unmanned store system 10, and may be provided to the manager. According to an example, an authentication code may be transmitted to the manager terminal T using a data communication manner. According to another example, an authentication code may be periodically reissued and printed out, and the manager carries the printed-out authentication code, and thus the manager may be directly provided with the authentication code. For example, the authentication code may be printed out by a receipt printer of the payment unit 170.

The controller 110 may control the second display 142 to display a list of products of which ID information has been scanned such that products in the unpayable state are distinguished from products in the payable state.

The controller 110 controls a payment with respect to a total price of products in the payable state. The controller 110 provides a total payment price to the payment unit 170. The payment unit 170 transmits the payment method information received from the user to the server 20 and receives a payment approval for the total payment price from the server 20. When the payment unit 170 receives a payment approval from the server 20, the controller 110 may control the display 140 to display a screen image provided according to a payment completion.

Figure 5:
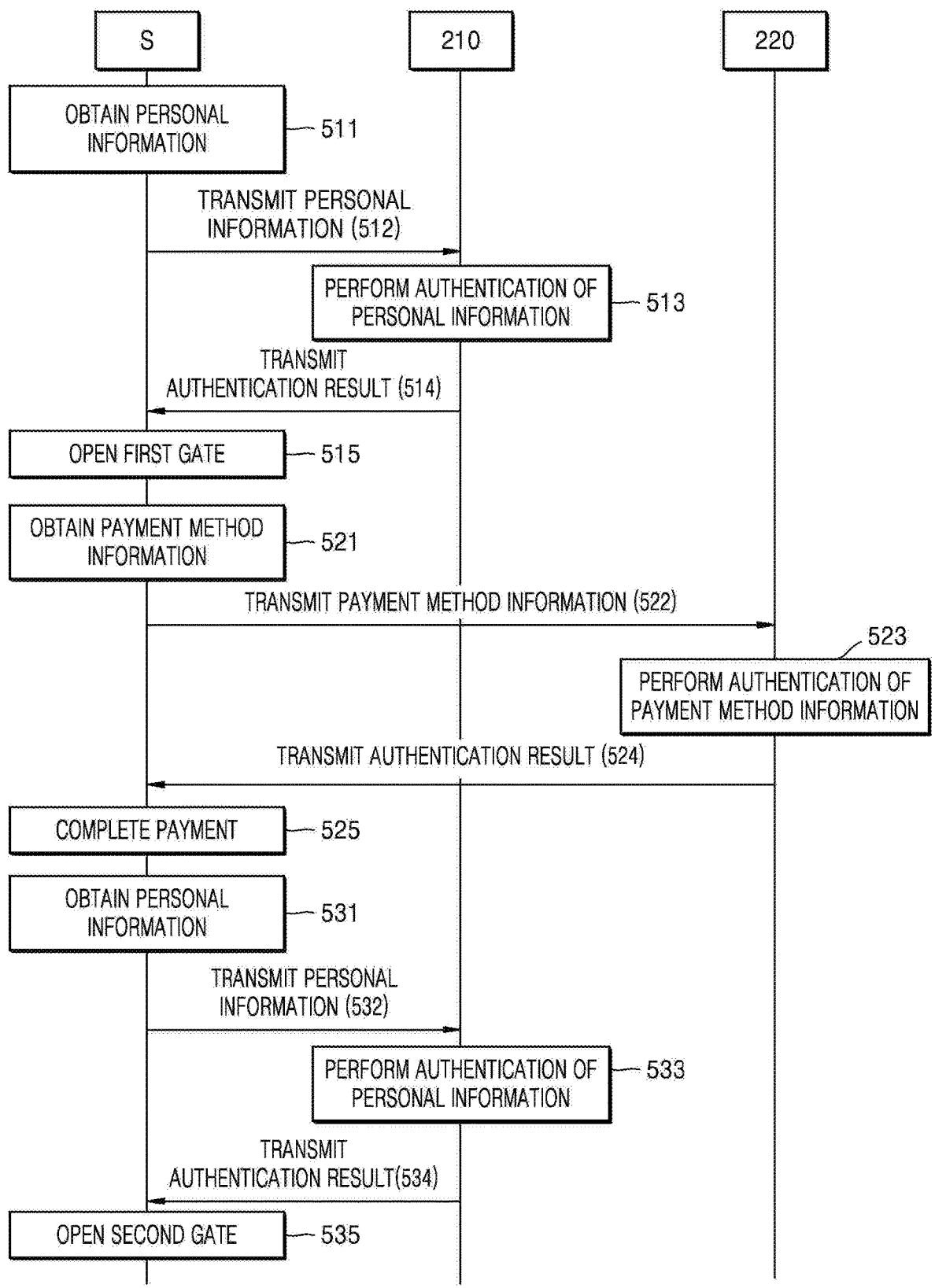
FIG. 5 is a flowchart of a method of controlling an unmanned store, according to an embodiment of the present invention.

FIG. 5 is a flowchart of a method of controlling an unmanned store, according to an embodiment of the present invention.

The flowchart of FIG. 5 shows operations serially performed in the unmanned checkout system of FIGS. 1-4. Accordingly, although omitted, the descriptions made above with respect to the components of FIGS. 1-4 may equally apply to the flowchart of FIG. 5. The method of the flowchart of FIG. 5 may be processed by the unmanned store S, a first server 210, and a second server 220.

The first server 210 and the second server 220 may be included in the server 20 of FIG. 1. The first server 210 and the second server 220 may be physically separated from each other, but embodiments are not limited thereto. The first server 210 and the second server 220 may be functionally separated from each other in a single physical server.

The first server 210 may perform authentication with respect to personal information. The second server 220 may perform authentication with respect to personal information and store bank account information corresponding to the personal information.

First, in operation 511, the first authentication device C1 of the unmanned store S obtains personal information from a user. The personal information may be biometric information obtained from a body part of the user. For example, the personal information may be vein pattern information obtained from the palm of the user, iris information of the user, face recognition information of the user, or a fingerprint of the user.

In operation 512, the first authentication device C1 of the unmanned store S transmits the personal information to the first server 210.

In operation 513, the first server 210 performs authentication with respect to the personal information. The first server 210 may store pre-registered personal information of the user. The first server 210 may determine whether the personal information received in operation 512 is the pre-registered personal information. When the personal information received in operation 512 is the pre-registered personal information, the first server 210 may authenticate the personal information.

In operation 514, the first server 210 transmits an authentication result to the unmanned store S.

In operation 515, when the authentication result received by the unmanned store S indicates that the personal information is authenticated, the gate control apparatus GC of the unmanned store S opens the first gate G1 so that the user may enter the unmanned store S.

In operation 521, the third authentication device C3 of the unmanned store S obtains payment method information from the user. The payment method information may include the aforementioned personal information. As described above, the personal information may be the biometric information of the user. The payment unit 170 may further receive additional information, such as a mobile phone number, from the user. In this case, the payment method information may include both the personal information and the additional information. The additional information does not necessarily need to be input via the payment unit 170, and may be input via a touch screen of the second display 142 or input by a special input device.

In operation 522, the payment unit 170 of the unmanned store S transmits the payment method information to the second server 220.

In operation 523, the second server 220 performs authentication with respect to the payment method information. The second server 220 may store pre-registered payment method information (including personal information and additional information) of the user and bank account information connected with the payment method information. The second server 220 may determine whether the payment method information transmitted in operation 522 is identical with the pre-registered payment method information. When the payment method information transmitted in operation 522 is identical with the pre-registered payment method information, the second server 220 may authenticate payment method information. When the payment method information is authenticated in operation 523, the second server 220 may approve a payment with the bank account information corresponding to the payment method information.

In operation 524, the second server 220 transmits an authentication result to the payment unit 170 of the unmanned store S. The authentication result transmitted in operation 524 may include an authentication result with respect to the payment method information of the user and a payment approval.

In operation 525, in response to the authentication result and the payment approval, the unmanned store S completes a payment. The completion of the payment means a payment-completed state. In operation 525, the payment unit 170 may output a receipt. In operation 525, the controller 110 may control the display 140 to display that the payment has been completed. While the payment is being conducted after operation 521, the controller 110 may restrict driving of the transfer unit 130 such that, even when an object is sensed by the first sensor 121, the transfer unit 130 is not driven. In this case, when the payment is completed in operation 525, the controller 110 may release the restriction of the driving of the transfer unit 130.

On the other hand, when the authentication result transmitted in operation 524 is "authentication failure", the method does not proceed to operation 525 and is concluded, and the controller 110 may control the second display to display information regarding the authentication failure and payment method information re-input guiding information.

In operation 531, the second authentication device C2 of the unmanned store S obtains personal information from the user. The second authentication device C2 may obtain the personal information of the user in the same manner as the first authentication device C1.

In operation 532, the second authentication device C2 transmits the personal information to the first server 210.

In operation 533, the first server 210 performs authentication with respect to the personal information. The authentication in operation 533 may be the same as that in operation 513.

In operation 534, the first server 210 transmits an authentication result to the second authentication device C2 of the unmanned store S.

In operation 535, the gate control apparatus GC opens the second gate G2 so that the user may exit the unmanned store S.

Figure 6:
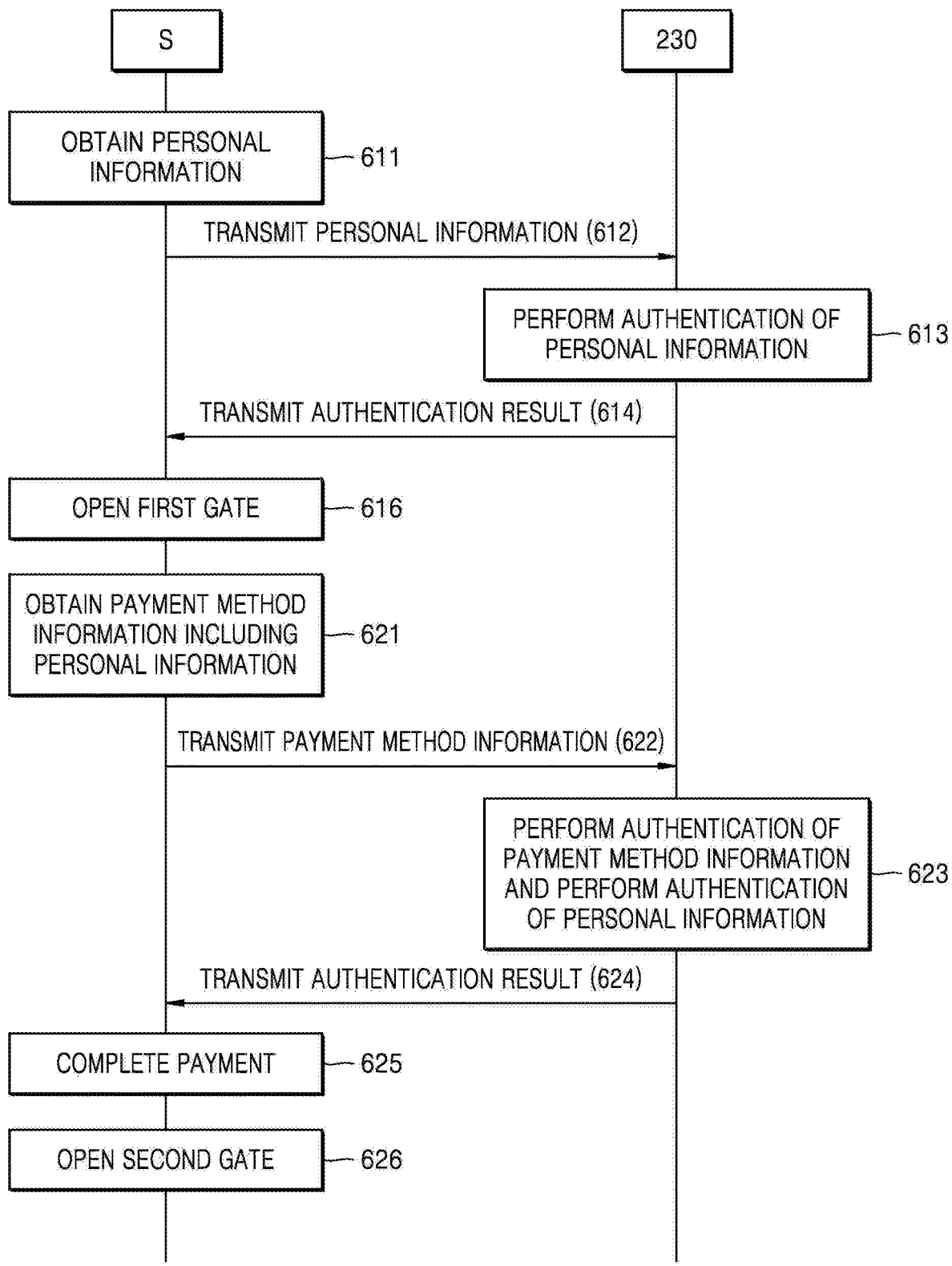
FIG. 6 is a flowchart of a method of controlling an unmanned store, according to another embodiment of the present invention.

FIG. 6 is a flowchart of a method of controlling an unmanned store, according to another embodiment of the present invention. FIG. 6 illustrates a modification of operations 521-535 of FIG. 5 in detail. In detail, FIG. 6 is a flowchart of an embodiment of controlling the second gate G2 without using the second authentication device C2.

The flowchart of FIG. 6 shows operations serially performed in the unmanned checkout system of FIGS. 1-4. Accordingly, although omitted, the descriptions made above with respect to the components of FIGS. 1-4 may equally apply to the flowchart of FIG. 6. The flowchart of FIG. 6 may be processed by the unmanned store S and a third server 230.

The third server 230 may be included in the server 20 of FIG. 1. The third server 230 may be a single integrated server capable of performing both the functions of the first server 210 and the second server 220.

Operations 611-615 of FIG. 6 correspond to operations 511-515 of FIG. 5, and thus, descriptions thereof will not be given here.

In operation 621, the unmanned checkout device 100 of the unmanned store S obtains payment method information including personal information from a user. In detail, the third authentication device C3 obtains the personal information from the user. The payment unit 170 may further receive additional information, such as a mobile phone number, from the user, and the payment method information may include both the personal information and the additional information. The additional information does not necessarily need to be input via the payment unit 170, and the additional information may be input via a touch screen of the second display 142 or input by a special input device connected to the third authentication device C3.

In operation 622, the payment unit 170 transmits the payment method information to the third server 230.

In operation 623, the third server 230 performs authentication with respect to the payment method information. The third server 230 may store pre-registered payment method information (including personal information and additional information) of the user and bank account information connected with the payment method information. The third server 230 may determine whether the payment method information transmitted in operation 622 is identical with the pre-registered payment method information. When the payment method information transmitted in operation 522 is identical with the pre-registered payment method information, the third server 230 may authenticate the payment method information. When the payment method information is authenticated in operation 623, the third server 230 may approve a payment with the bank account information corresponding to the payment method information.

In operation 623, in addition to the authentication performed with respect to the payment method information, the third server 230 may further performed authentication with respect to the personal information. Accordingly, according to a result of the authentication with respect to the personal information, the second gate G2 is controlled so that the user may exit the unmanned store S. In operation 623, the third server 230 determines whether the received personal information is the pre-registered personal information of the user, and, when the received personal information is the pre-registered personal information of the user, the third server 230 processes the personal information to be authenticated.

In operation 624, the third server 230 transmits an authentication result on the personal information and the payment method information to the payment unit 170. The authentication result transmitted in operation 624 may include a payment approval for a payment using the bank account information corresponding to the payment method information.

In operation 625, the unmanned store S completes the payment. The descriptions made above with respect operation 525 of FIG. 5 may equally apply to the completion of the payment.

In operation 626, according to the authentication result transmitted in operation 624, the gate control apparatus GC of the unmanned store S opens the second gate G2 so that the user may exit the unmanned store S.

However, according to an embodiment, in operation 623, the third server 230 may only perform authentication with respect to the payment method information and may not perform authentication with respect to the personal information. In this case, in operation 624, an authentication result with respect to the payment method information may be transmitted, and, in operations 625 and 626, the unmanned store S may complete the payment according to the authentication result with respect to the payment method information and open the second gate G2.

According to the embodiment of FIG. 6, using the personal information input once by the user to pay the product price, both authentication with respect to the payment method information for a product price payment and authentication with respect to the personal information for a gate control may be performed. Thus, the user may reduce the burden of inputting the personal information one more time to exit the unmanned store S.

Figure 7:
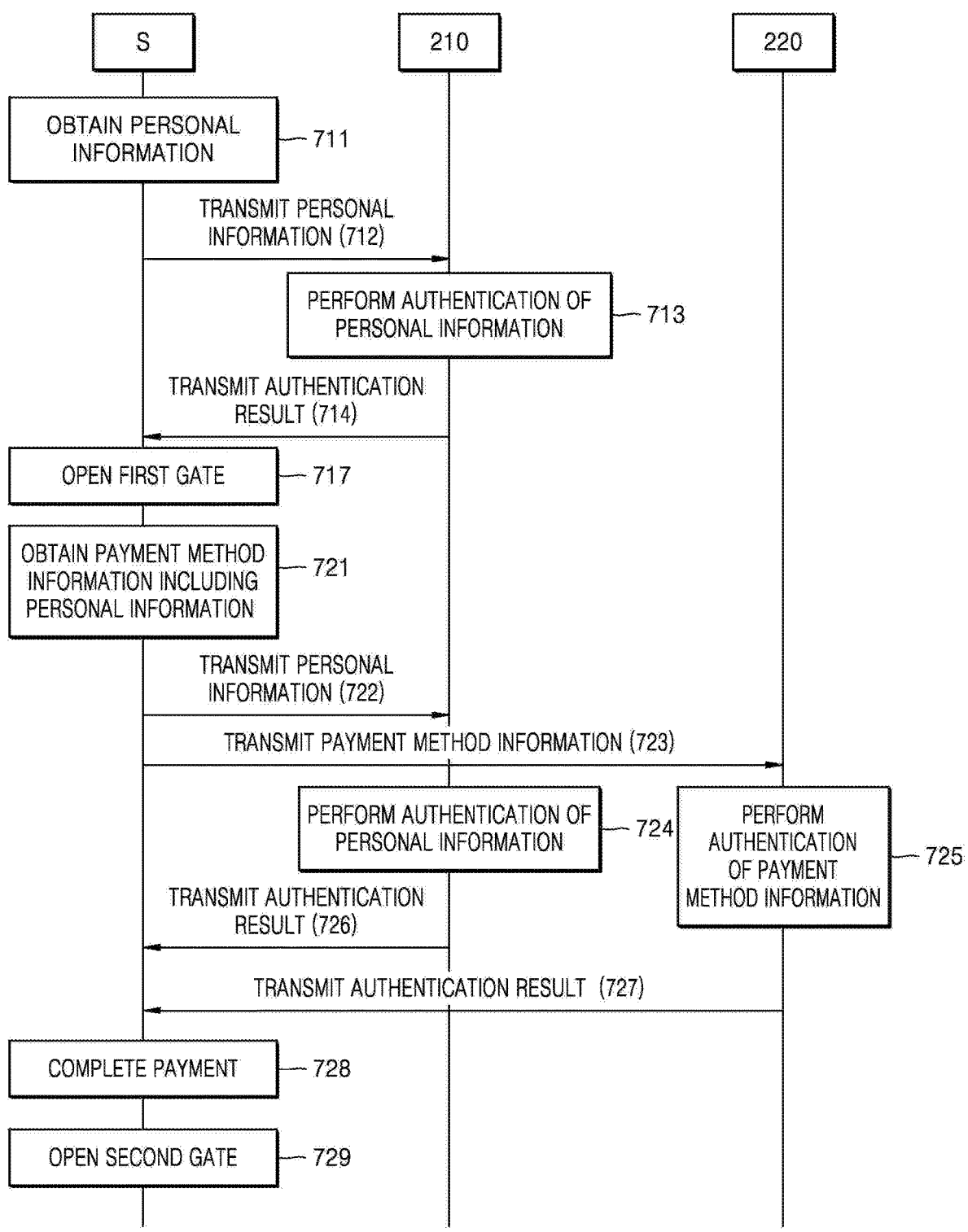
FIG. 7 is a flowchart of a method of controlling an unmanned store, according to another embodiment of the present invention.

FIG. 7 is a flowchart of a method of controlling an unmanned store, according to another embodiment of the present invention.

FIG. 7 illustrates a modification of operations 622-624 of FIG. 6 in detail. FIG. 7 illustrates an embodiment in which the operations performed by the third server 230 of FIG. 6 may be distributed to and performed by the first server 210 and the second server 220.

Referring to FIG. 7, the second gate G2 may be controlled without using the second authentication device C2, which performs authentication with respect to the payment method information, and a personal information authentication unit for controlling the second gate G2 may be separated from a payment method information authentication unit for approving a product price payment.

The flowchart of FIG. 7 includes operations serially performed in the unmanned checkout system of FIGS. 1-4. Accordingly, although omitted, the descriptions made above with respect to the components of FIGS. 1-4 may equally apply to the flowchart of FIG. 7. The flowchart of FIG. 7 may be processed by the unmanned store S, the first server 210, and the second server 220.

Operations 711-721 of FIG. 7 correspond to operations 611-621 of FIG. 6, and thus descriptions thereof will not be given here.

In operation 722, the unmanned store S transmits personal information, which is biometric information, of a user to the first server 210. In operation 723, the unmanned store S transmits payment method information including personal information and additional information of the user to the second server 220. The order of operation 722 and operation 723 may be changed, and operation 722 and operation 723 may be performed simultaneously.

Operation 722 may be performed by the third authentication device C3 of the unmanned store S, and operation 723 may be performed by the payment unit 170 of the unmanned store S. However, operation 723 may be performed by various units as a unit that receives the additional information of the user changes.

In operation 724, the first server 210 performs authentication with respect to the personal information of the user. The authentication in operation 724 may be conducted in the same manner as the authentication in operation 713, and may be performed to control the second gate G2.

In operation 725, the second server 220 performs authentication with respect to the payment method information. Operation 725 may correspond to operation 523 of FIG. 5, and thus a detailed description thereof will be omitted.

In operation 726, the first server 210 transmits an authentication result with respect to the personal information. In operation 727, the second server 220 transmits an authentication result with respect to the payment method information. The order of operation 726 and operation 727 may be changed, and operation 726 and operation 727 may be performed simultaneously.

In operation 728, the unmanned store S completes a payment. Operation 728 may correspond to operation 525 of FIG. 5.

In operation 729, the gate control apparatus GC of the unmanned store S opens the second gate G2. Operation 729 may correspond to operation 535 of FIG. 5.

Figure 8:
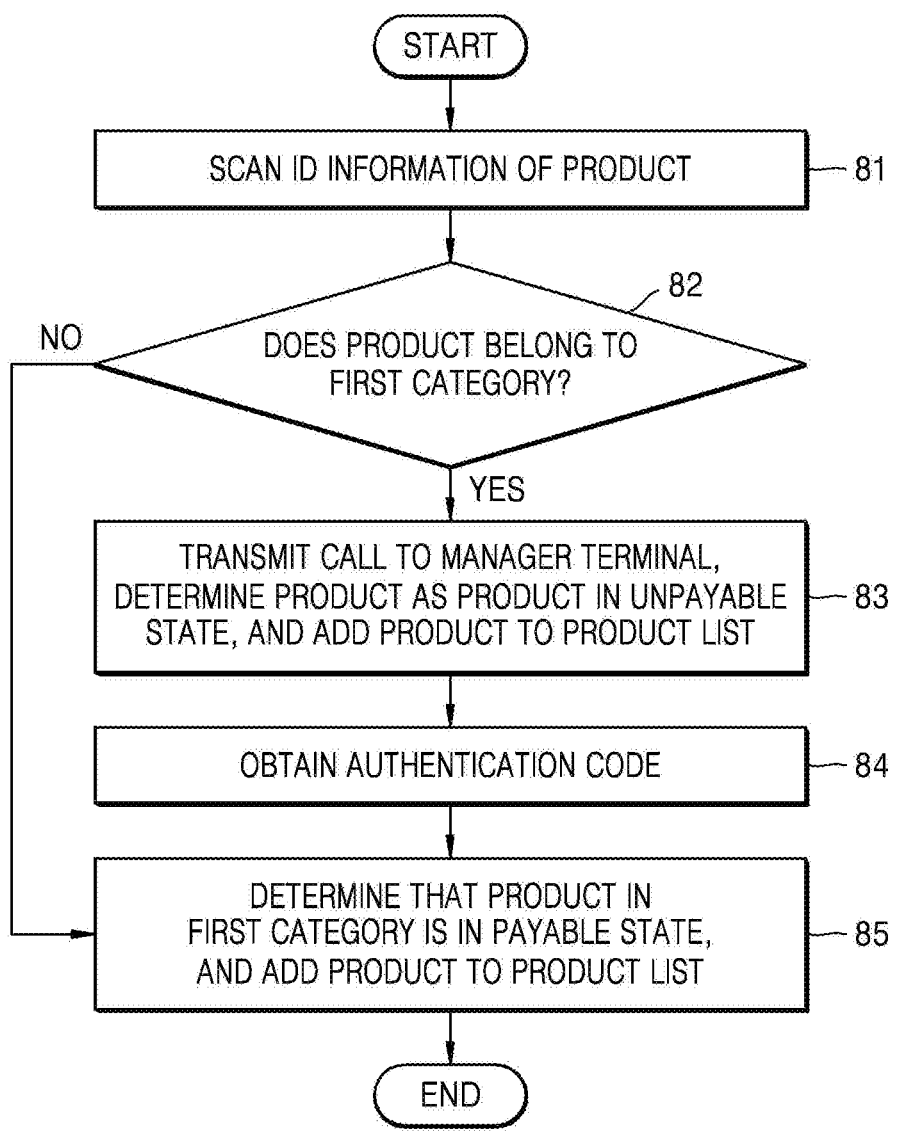
FIG. 8 is a flowchart of a controlling method performed by the unmanned checkout device, according to an embodiment of the present invention.

FIG. 8 is a flowchart of a controlling method performed by the unmanned checkout device 100, according to an embodiment of the present invention.

The flowchart of FIG. 8 shows operations serially performed in the unmanned checkout system of FIGS. 1-4. Accordingly, although omitted, the descriptions made above with respect to the components of FIGS. 1-4 may equally apply to the flowchart of FIG. 8. A data processing method shown in FIG. 8 may be performed by the unmanned checkout device 100 under the control of the controller 110.

In operation 81, the scanner 160 scans ID information of a product.

In operation 82, the controller 110 determines whether the product belongs to a first category, based on the ID information scanned in operation 81. In operation 82, the controller 110 may access a database that stores substantial information of the product according to the ID information of the product, via communication, and may check the substantial information of the product corresponding to the ID information scanned in operation 81. The substantial information of the product may include a product name, a price, a category, and the like. The controller 110 determines whether a product category included in the checked substantial information corresponding to the ID information scanned in operation 81 is the first category. The first category may be a category that needs an authentication code input by the manager.

When the product belongs to the first category, the method proceeds to operation 83. Otherwise, the method proceeds to operation 85.

In operation 83, the controller 110 transmits a call to the manager terminal T, determines the product as a product in an unpayable state, and adds the product to a product list.

In operation 84, the manager inputs an authentication code corresponding to the first category by using the reader 164 or the like. The scanner 160 obtains an authentication code.

In operation 85, the controller 110 determines the product in the first category as a product in a payable state and adds the product to the product list.

When operation 85 is performed via operation 83, the product may have already been added to the product list. Thus, in this case, in operation 85, the controller 110 changes the product having already been added to the product list but being in an unpayable state from the unpayable state to a payable state.

Although not shown in FIG. 8, after operation 85, the user may perform a final payment on only products in a payable state from among the products included in the product list.

Figure 9:
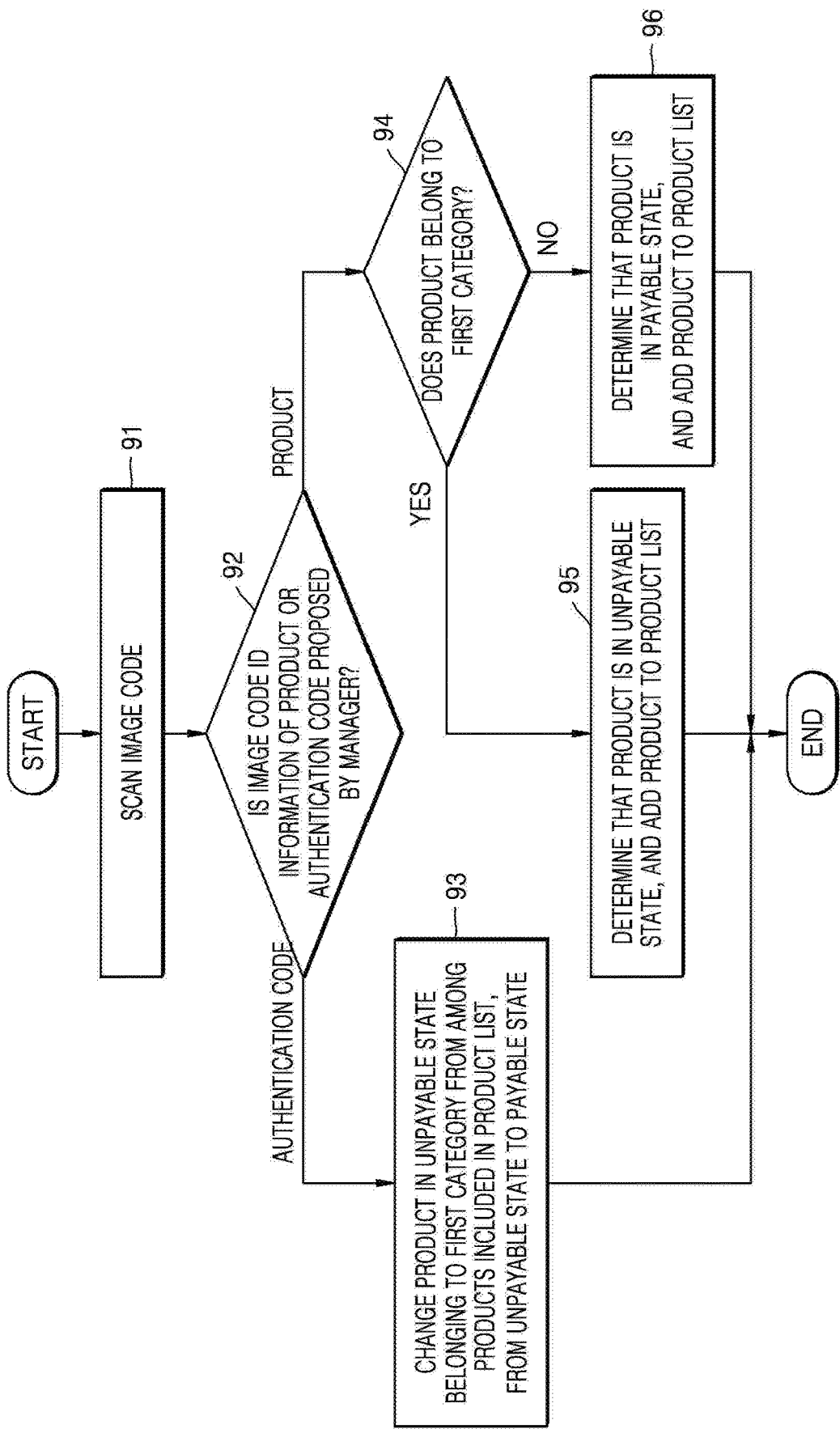
FIG. 9 is a flowchart of a controlling method performed by the unmanned checkout device, according to another embodiment of the present invention.

FIG. 9 is a flowchart of a controlling method performed by the unmanned checkout device 100, according to another embodiment of the present invention. FIG. 9 illustrates a controlling method, corresponding to one cycle, of performing a process corresponding to a case when a single image code has been scanned by the scanner 160. In other words, every time an image code is scanned by the scanner 160, the controlling method shown in FIG. 9 may be repeatedly performed.

The flowchart of FIG. 9 shows operations serially performed in the unmanned checkout system of FIGS. 1-4. Accordingly, although omitted, the descriptions made above with respect to the components of FIGS. 1-4 may equally apply to the flowchart of FIG. 9. A data processing method shown in FIG. 9 may be performed by the unmanned checkout device 100 under the control of the controller 110.

In operation 91, the scanner 160 scans an image code sensed within a scan region. The image code may be the ID information of the product or an authentication code proposed by the manager.

In operation 92, the controller 110 determines whether the image code scanned in operation 91 is the ID information of the product or the authentication code proposed by the manager. When the image code is the authentication code of the manager, the method proceeds to operation 93. When the image code is the ID information of the product, the method proceeds to operation 94. The authentication code of the manager may be an authentication code corresponding to a first category.

In operation 93, the controller 110 changes a product in an unpayable state belonging to the first category from among the products included in a product list, from the unpayable state to a payable state.

On the other hand, when the ID information of the product is scanned, the controller 110 adds the product to the product list after performing operation 94 and its subsequent operations.

In operation 94, the controller 110 checks substantial information of the product corresponding to the ID information of the product. The substantial information may include a product name, a price, and a category. When the product belongs to the first category, namely, when a category corresponding to the ID information of the product is the first category, the controller 110 performs operation 95. Otherwise, the controller performs operation 96.

In operation 95, the controller 110 determines the product as a product in an unpayable state and adds the product to the product list.

In operation 96, the controller 110 determines the product as a product in a payable state and adds the product to the product list.

Although a product category that requires an authentication code of the manager is a single category, namely, the first category, in FIG. 9, a plurality of categories may require an authentication code of the manager. For example, a first category that requires a first authentication code and a second category that requires a second authentication code may exist.

In this case, in operation 93, the controller 110 may change a state of a product in a category corresponding to the authentication code of the manager to a payable state. When the product belongs to a category (e.g., the first or second category) that requires authentication code of the manager, in operation 94, the controller 110 may perform operation 95. Otherwise, the controller may perform operation 96.

Figure 10:
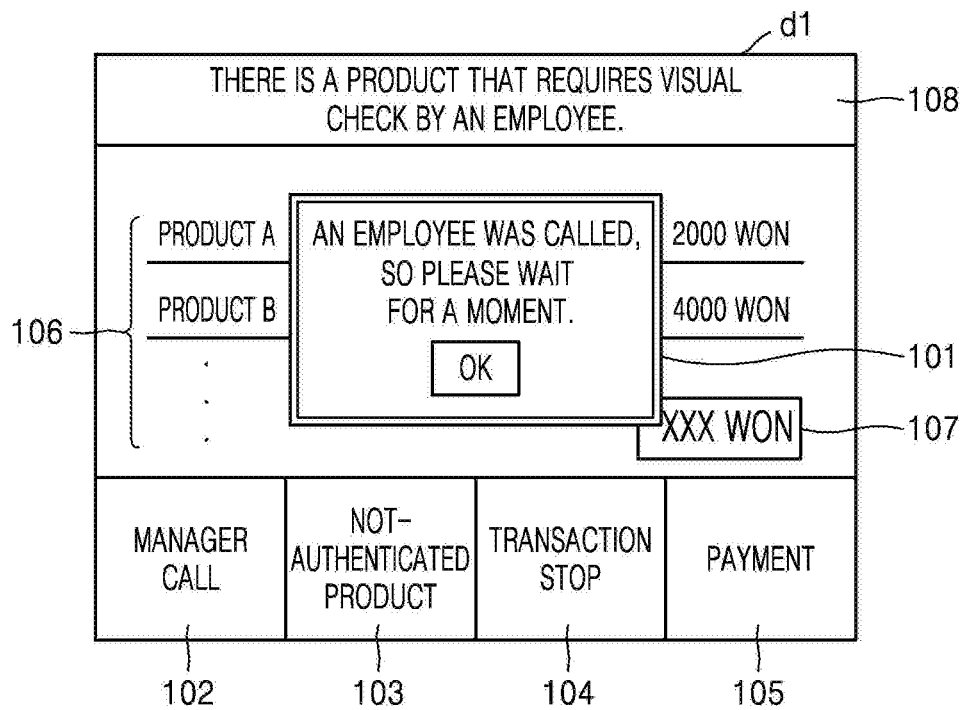
FIG. 10 is an example of a screen image displayed on a display.

FIG. 10 is an example of a screen image displayed on the display 140.

In detail, after a category corresponding to ID information of a scanned product corresponds to a first category that requires an authentication code of the manager and thus the manager terminal T is called, a screen image d1 of FIG. 10 may be displayed on the second display 142.

Referring to FIG. 10, a guiding message 108 "There is a product that requires visual visual check by an employee." is displayed on an upper end of the screen image d1.

A list 106 of products scanned by the scanner 160 and a total price 107 of the products are displayed below the upper end of the screen image d1.

A button 102 for manually calling the manager, a button 103 allowing the user to see products kept in an unpayable state due to non-scanning of the authentication code of the manager, namely, non-authenticated products, a button 104 for stopping a transaction, and a button 105 for proceeding to a final payment are displayed on a lower end of the screen image d1.

A pop-up window 101 is displayed at the center of the screen image d1, and a message informing the user that an employee was called is displayed in the pop-up window 101.

In FIG. 10, the products included in the list 10 are shown without a displaying effect applied thereto. However, according to an example, a display effect may be applied to some of the products included in the list 10. For example, a non-authenticated product from among the products included in the list 10 may be distinguished from the other products by a displaying effect applied to the non-authenticated product. For example, the non-authenticated product may be shaded or displayed in a specific color. However, the user may press the button 103 to separately check only a list of non-authenticated products.

Figure 11:
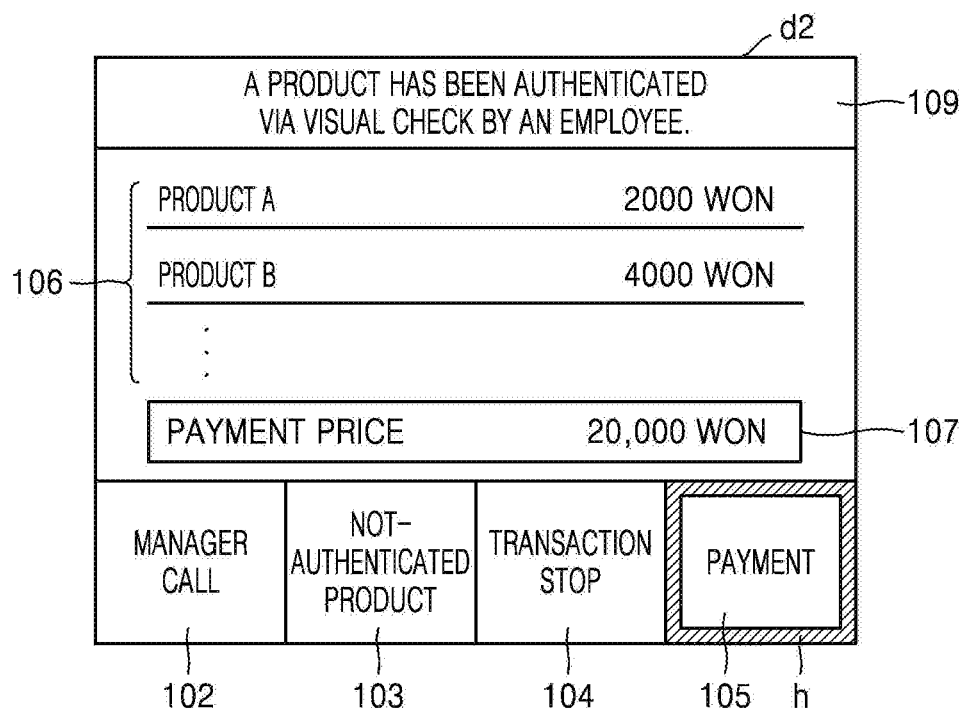
FIG. 11 is another example of a screen image displayed on the display.

FIG. 11 is another example of a screen image displayed on the display 140.

In detail, when an authentication code proposed by the manager is scanned by the scanner 160 and all of the products included in a product list are in a payable state, a screen image d2 of FIG. 11 may be displayed on the second display 142.

Referring to FIG. 11, a guiding message 109 "A product has been authenticated via visual check by an employee." is displayed on an upper end of the screen image d2.

Compared with the screen mage d1 of FIG. 10, a highlight h is applied to a payment button 105. To intuitively display that all of the products included in the product list are in a payable state and thus payment therefor is possible, the controller 110 may apply the highlight h to the payment button 105.

At the moment when the authentication code proposed by the manager is scanned and thus all of the products included in the product list are in a payable state, the controller 110 may control the highlight h to be applied to the payment button 105, and the user may intuitively check a change in the states of the products.

According to the above-described embodiments, the scanner 160 may scan an image code based on images. For example, ID information may be recognized from an image of a product.

According to the above-described embodiments, when an image has been captured from a product but an ID code corresponding to the image has not been scanned by the scanner 160, the controller 110 may classify the product as a non-scanned product. The controller 110 may distinguish a scanned product list from a non-scanned product list and display them on the second display 142. Alternatively, the scanned product list may be displayed, and a button for checking the not-scanned product list may also be displayed. In this case, when the user selects the button for checking the not-scanned product list, the controller 110 enumerates and displays images of non-scanned products on the second display 142, and induces the user to manually scan the ID information of the non-scanned products, via a voice or a screen image. When the user scans the ID information of the non-scanned product by using the reader 164 or the like, the controller 110 adds the product corresponding to the ID information scanned by the user to the scanned product list. A button for checking the non-scanned product list may be displayed together with other buttons on the lower end of the screen image d1 of FIG. 10 or a lower end of the screen image d2 of FIG. 11.

According to the above-described embodiments, the controller 110 may first determine whether the second sensor 122 senses an object, in order to start a scan operation. While the second sensor 122 is sensing an object, even when an object is sensed by the first sensor 121, the controller 110 may not drive the transfer unit 130.

According to the above-described embodiments, after a payment by the payment unit 170 starts, the controller 110 may monitor whether the payment unit 170 has received a final payment approval. Accordingly, when the payment unit 170 has not received a final payment approval after a payment of a previous user starts, the controller 110 may determine that the previous user is under payment, and may not drive the transfer unit 130. Starting a payment means that a user checks a product list and a price displayed on the second display 142, then select a payment, and enters in a state in which the user is capable of inputting payment method information to the payment unit 170.

In other words, when a payment of a first user has started and has not yet been concluded, scanning of a product of a second user, who is next to the first user, does not start. When the first user exists in the sensing region of the second sensor 122 even when the payment of the first user has been concluded, scanning of the product of the second user does not start. When the payment of the first user is completed, the first user no longer exists in the sensing region of the second sensor 122, and the second user or the product of the second user is sensed by the first sensor 121, scanning of the product of the second user starts. In other words, the controller 110 may stop the transfer unit 130 from being driven, regardless of the sensing of the sensor unit 120, from a moment when the payment unit 170 starts to process payment to a moment when the payment unit 170 receives a payment approval. According to the present embodiment, because transferring the product of the second user starts after the first user completes payment, takes his or her products, and deviates from the second region, mixing and stacking of the products of the first user and the second user may be prevented.

According to the above-described embodiments, when the user is sensed by the second sensor 122, the controller 110 may control the second light-emitter 152 to emit light in the first state. The first state may be a preset state in which the first light-emitter 151 is turned on so that the user may intuitively recognize the meaning of "ON". For example, in the first state, the second light-emitter 152 may emit light in at least one preset color that gives a positive impression, such as a green color, a blue color, and a white color.

In order to prevent a next user from entering the entry end and putting a product thereon while a previous user is conducting a payment, when the previous user is sensed by the second sensor 122, the controller 110 may control the first light-emitter 151 on the entry end to emit light in the second state. The second state may be a preset state in which the second light-emitter 152 is turned on so that a user may intuitively recognize the meaning of "STOP". For example, in the second state, the first light-emitter 151 may emit light in at least one preset color that gives a negative impression, such as a red color and a yellow color.

According to the above-described embodiments, if non-scanned products exist and thus the second display 142 displays a not-scanned product list, the payment button may be deactivated. The user needs to manually scan ID information of the non-scanned products by using the reader 164 or to put the non-scanned products into the scanner 160 again to perform automatic scanning, and thus the non-scanned products corresponding to the scanned ID information are added to the scanned product list and are deleted from the not-scanned product list. When scanning of the ID information of the non-scanned products is completed, the payment button may be activated, and the user may select the payment button and start a payment. When the payment starts, the user enters in a state in which the user is capable of inputting payment method information to the payment unit 170.

According to the above-described embodiments, when authentication of the payment method information by the server 20 is completed, a payment may be made using bank account information corresponding to the payment method information, for example, a credit card of the user.

According to the above-described embodiments, while a first user is performing a payment after scanning is concluded, the controller 110 may provide an advertisement on the first display 141 to expose the advertisement to a second user who is waiting in line. According to the above-described embodiments, while scanning is being conducted, the controller 110 may provide an advertisement on the second display 142 to expose the advertisement to other users.

In an unmanned store system, a method of controlling the unmanned store system, a computer program for executing the method, and an unmanned checkout device according to embodiments of the present invention, a user is able to directly input payment method information and pay the price of a product without employees. Thus, personnel expenses for hiring an employee may be saved.

In an unmanned store system, a method of controlling the unmanned store system, a computer program for executing the method, and an unmanned checkout device according to embodiments of the present invention, a product that requires a visual check by a manager (employee) may be paid only when an authentication code of the manager is scanned. Accordingly, when an unmanned checkout is restricted according to a legal restriction or the like, the manager may intervene.

In an unmanned store system, a method of controlling the unmanned store system, a computer program for executing the method, and an unmanned checkout device according to embodiments of the present invention, information related to product scanning and payment is intuitively provided to a user by using a light-emitter and a display. Thus, the user may be suitably guided without employee's guide, contributing to user convenience.

The methods according to the embodiments of FIGS. 5-9 can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope as defined by the following claims.

What is claimed is:

1. A store system comprising:
an authentication device configured to obtain personal information from a part of a body of a user, transmit the personal information to a first server, and receive authentication of the personal information from the first server;
a gate control apparatus configured to open a gate so that the user may enter or exit a store, when the authentication device receives the authentication; and
a checkout device configured to obtain personal information from a part of a body of the user, transmit the personal information to a second server, and pay a product price when receiving authentication of the personal information from the second server, and
wherein the checkout device comprises a scanner,
when identification (ID) information of a product is scanned by the scanner, the unmanned checkout device is configured to determine that the product is in an unpayable state or a payable state according to a category of the product and add the product to a product list, and
when an authentication code is scanned by the scanner, the checkout device is configured to change the unpayable state of the product in a first category, which is a category corresponding to the authentication code, from among products in the product list, to a payable state.

2. The store system of claim 1, wherein
the authentication device comprises:
a first authentication device configured to be accessible from outside the store; and
a second authentication device configured to be accessible from inside the store, and
the gate control apparatus is configured to open a first gate to allow the user to enter the store when the first authentication device receives authentication from the first server, and is configured to open a second gate to allow the user to exit the store when the second authentication device receives authentication from the first server.

3. The store system of claim 1, wherein
the authentication device comprises a first authentication device configured to be accessible from outside the store,
the gate control apparatus is configured to open a first gate to allow the user to enter the store when the first authentication device receives an authentication from the first server, and
the checkout device is configured to pay a total price of a scanned product and open a second gate to allow the user to exit the store when the checkout device receives authentication from the second server.

4. The store system of claim 1, wherein
when a product in the first category is scanned, the checkout device is configured to determine that the product in the first category is in an unpayable state in which a final payment by the user is impossible, transmit a call to a manager terminal, and in response to scanning the authentication code corresponding to the first category, change the unpayable state of the product in the first category to a payable state in which a final payment by the user is possible, and
when a product in a category other than the first category is scanned, the checkout device is configured to determine that the product in a category other than the first category is in the payable state.

5. The store system of claim 4, wherein a management server is configured to reissue the authentication code at intervals of a preset period and transmit the authentication code to the manager terminal.

6. The store system of claim 1, wherein the first server and the second server are the same server.

7. A method of controlling a store system via a processor, the method comprising:
obtaining personal information from a part of a body of a user, transmitting the personal information to a first server, and receiving authentication of the personal information from the first server, wherein the obtaining, transmitting, and receiving are performed by a first authentication device;
opening a first gate to allow the user to enter a store when the first authentication device receives the authentication, wherein the opening is performed by a gate control apparatus; and
obtaining personal information from a part of a body of the user, transmitting the personal information to a second server, and paying a total product price when receiving authentication of the personal information from the second server, wherein the obtaining, transmitting, and paying are performed by a checkout device, and wherein the paying comprises:

in response to scanning ID information of a product by using a scanner of the checkout device, determining that the product is in an unpayable state or a payable state according to a category of the product and adding the product to a product list; and in response to scanning an authentication code by using the scanner, changing a state of a product in a first category, which is a category corresponding to the authentication code, from among products included in the product list, to a payable state.

8. The method of claim 7, further comprising:

obtaining personal information from a part of a body of a user, transmitting the personal information to a first server, and receiving authentication of the personal information from the first server, wherein the obtaining, transmitting, and receiving are performed by a second authentication device; and opening a second gate to allow the user to exit the store when the second authentication device receives the authentication, wherein the opening is performed by the gate control apparatus, wherein the first authentication device is configured to be accessible from outside the store, and the second authentication device is configured to be accessible from inside the store.

9. The method of claim 7, wherein the first authentication device is configured to be accessible from outside the store, and the paying comprises opening a second gate to allow the user to exit the store when receiving authentication from the second server, wherein the opening is performed by the gate control apparatus.

10. The method of claim 7, wherein the paying comprises:

scanning ID information of a product by using a scanner of the checkout device;

determining whether the product belongs to a preset first category;

when the product belongs to the first category, determining that the product is in an unpayable state in which a final payment by the user is impossible and transmitting a call to a manager terminal; and in response to scanning the authentication code corresponding to the first category, changing the unpayable state of the product in the first category to a payable state in which a final payment by the user is possible.

11. The method of claim 10, wherein a management server of the store system is configured to reissue the authentication code at intervals of a preset period and transmit the authentication code to the manager terminal.

12. A non-transitory computer program stored on a medium to execute the method of claim 7 by using a computer.

13. A checkout device comprising:

a scanner; and a controller configured to, when identification (ID) information of a product in a preset first category is scanned by the scanner, determine that the product in a first category is in an unpayable state in which a final payment by a user is impossible, add the product to a product list, and transmit a call to a manager terminal, when a product in a category other than the first category is scanned by the scanner, determine that the product in a category other than the first category is in a payable state in which a final payment by the user is possible and add the product to the product list, and when an authentication code corresponding to the first category is scanned by the scanner, change the unpayable state of the product in the first category, which is a category corresponding to the authentication code, from among products in the product list, to a payable state.

* * * * *

UNITED STATES PATENT AND TRADEMARK OFFICE
CERTIFICATE OF CORRECTION

PATENT NO. : 10,937,028 B2  
APPLICATION NO. : 15/720915  
DATED : March 2, 2021  
INVENTOR(S) : Seong In Jung, Young Hyouk Kim and Su Nyun Kim Page 1 of 1

It is certified that error appears in the above-identified patent and that said Letters Patent is hereby corrected as shown below:

In the Claims

In Column 25, Line 63 please remove "the unmanned checkout device" and insert --the checkout device--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*